(12) United States Patent
Kobayashi et al.

(10) Patent No.: US 7,015,632 B2
(45) Date of Patent: Mar. 21, 2006

(54) LIGHT SOURCE DEVICE, METHOD OF PRODUCING THE SAME, AND DISPLAY APPARATUS

(75) Inventors: Tetsuya Kobayashi, Kawasaki (JP); Keiji Hayashi, Kawasaki (JP); Koshu Yonemura, Kawasaki (JP); Fumiaki Yamada, Kawasaki (JP); Kazumasa Kaiwa, Yokohama (JP); Hiroyoshi Takahashi, Kawasaki (JP); Toshihiro Suzuki, Kawasaki (JP); Takeshi Gotoh, Kawasaki (JP); Tetsuya Hamada, Kawasaki (JP); Mari Sugawara, Kawasaki (JP); Seiji Hayashimoto, Kawasaki (JP)

(73) Assignees: Sharp Kabushiki Kaisha, Osaka (JP); Fujitsu Kasei Limited, Yokohama (JP)

( * ) Notice: Subject to any disclaimer, the term of this patent is extended or adjusted under 35 U.S.C. 154(b) by 0 days.

(21) Appl. No.: 10/109,584

(22) Filed: Mar. 28, 2002

(65) Prior Publication Data

US 2003/0062814 A1    Apr. 3, 2003

(30) Foreign Application Priority Data

Sep. 28, 2001    (JP)    .............................. 2001-303981

(51) Int. Cl.
*H01J 1/02*    (2006.01)
(52) U.S. Cl. .......................... 313/42; 313/46; 313/625; 313/49; 362/218; 362/264; 362/373
(58) Field of Classification Search ................. 313/46, 313/623, 332, 335, 217, 218, 220, 49, 51, 313/624, 625, 318.09, 11, 19, 21, 25, 39, 313/42, 113, 573; 362/218, 264, 294, 373; 165/58, 67, 42
See application file for complete search history.

(56) References Cited

U.S. PATENT DOCUMENTS

| | | | | |
|---|---|---|---|---|
| 3,675,068 A | * | 7/1972 | Strauss ........................ | 313/217 |
| 4,069,437 A | * | 1/1978 | Notelteirs et al. .......... | 313/315 |
| 4,806,769 A | * | 2/1989 | Mori et al. ............... | 250/443.1 |
| 5,099,380 A | * | 3/1992 | Childers et al. .............. | 361/56 |
| 5,161,884 A | * | 11/1992 | Siminovitch ................. | 362/294 |
| 5,174,646 A | * | 12/1992 | Siminovitch et al. ........ | 362/218 |
| 5,304,892 A | * | 4/1994 | Lewandowski et al. ..... | 313/623 |
| 5,463,541 A | * | 10/1995 | Greene ......................... | 362/369 |
| 5,697,696 A | * | 12/1997 | Kuroda et al. ................ | 362/218 |
| 5,720,546 A | * | 2/1998 | Correll et al. ............... | 362/221 |
| 6,024,465 A | * | 2/2000 | Kobayashi ................... | 362/218 |
| 6,495,960 B1 | * | 12/2002 | Takeji et al. ................. | 313/634 |
| 6,515,433 B1 | * | 2/2003 | Ge et al. ..................... | 313/491 |

* cited by examiner

*Primary Examiner*—Karabi Guharay
*Assistant Examiner*—German Colón
(74) *Attorney, Agent, or Firm*—Greer, Burns & Crain, Ltd

(57) ABSTRACT

The present invention relates to a light source device including discharge tubes that emit light by discharging in a thin atmosphere, a method of producing the light source device, and a display apparatus in which the light source device is employed. This light source device includes discharge tubes and a heat conductive member that is brought into contact with the neighboring area of the electrodes of the discharge tubes so as to locally cool down the neighboring area of the electrodes. In the light source device, a low heat conductivity member having lower heat conductivity than the heat conductive member is interposed between the heat conductive member and the discharge tubes. With such a structure, the luminance in the entire light source device can be increased and made uniform, and the reliability of the light source device can be increased accordingly.

18 Claims, 23 Drawing Sheets

30A LIGHT SOURCE DEVICE

301 LIGHT SOURCE DEVICE

30J LIGHT SOURCE DEVICE

LIGHT SOURCE DEVICE, METHOD OF PRODUCING THE SAME, AND DISPLAY APPARATUS

BACKGROUND OF THE INVENTION

The present invention generally relates to light source devices, methods of producing the light source devices, and display apparatuses, and, more particularly, to a light source device provided with discharge tubes that discharge electricity to emit light in a thin atmosphere, a method of producing such a light source device, and a display apparatus utilizing such a light source device.

Conventionally, the backlight of a display apparatus such as a liquid display apparatus is formed with a light source device that includes one or a plurality of discharge tubes and a reflector. The discharge tubes are cold cathode tubes, in which mercury is sealed in Ar gas or Ne gas. A fluorescent material is applied to the walls of the discharge tubes. The mercury gas generates ultraviolet rays during electric discharge, and the ultraviolet rays impinging onto the fluorescent material cause visible rays.

Most of the backlights of conventional liquid crystal display apparatuses are provided with a light guide plate. For instance, a light guide plate is flanked by two light source devices in a conventional liquid crystal display apparatus. Each of the light source devices includes two discharge tubes and a reflector. The two discharge tubes each having a diameter of several millimeters are arranged in a narrow space having a width of less than 10 millimeters. In this arrangement, the surrounding temperature of the discharge tubes often rises to 70° C. or higher. The temperature rise in the vicinity of the electrodes of the discharge tubes is particularly large. When the supply current is increased to obtain a greater luminance, the temperature of the neighboring area of the electrodes rises to 120° C. or higher.

The amount of light emission of the discharge tubes tends to decreases at a high temperature. Regarding the ultraviolet ray generating rate of the mercury gas, the concentration of the mercury gas varies in proportion to the amount of electric current. Meanwhile, the mercury gas absorbs the ultraviolet rays, and the absorbing rate varies exponentially with the product of the mercury gas concentration and the transmission distance. In other words, the transmittance varies as the concentration and the transmission distance increase.

The ultraviolet rays are converted into visible rays by the fluorescent material applied to the walls of the discharge tubes. The incident rate of one ultraviolet-ray photon impinging upon the fluorescent material is equal to the product of the diameter of each discharge tube and the concentration of the mercury gas. To sum up the above facts, the amount of visible ray emission can be expressed as follows:

$$I = k \times (J \times n) \times exp(-b \times n \times d) \qquad (1)$$

Where I represents the amount of visible ray emission, d represents the diameter of each discharge tube, n represents the concentration of the mercury gas (a function of the temperature of the discharge tubes), J represents the amount of electric current, and k and b represent proportional constants. According to the equation (1), I takes the maximum value with a predetermined mercury gas concentration value n. When the concentration of the mercury gas exceeds the predetermined concentration value n, the amount of visible ray emission decreases. Since the concentration of the mercury gas varies exponentially with the temperature of the mercury gas, the luminance decreases at a high temperature as the temperature of each discharge tube increases.

Also, the temperature of each discharge tube increases with the amount of electric current. At a certain environmental temperature, the amount of visible ray emission decreases, even when the amount of electric current increases. Such a decrease of visible ray emission causes a problem in maintaining the luminance level of the backlight.

In the light source device, the electrodes provided at both ends of the discharge tubes have the highest temperature when the discharge tubes are turned on. To cool both ends of the discharge tubes, heat conductive members (heat conductive rubber caps, for example) are provided at both ends of the discharge tubes, and are engaged with the reflector.

However, the contact between the heat conductive members (the heat conductive rubber caps) and the discharge tubes is often insufficient, as shown in FIG. 2. Because of the insufficient contact, sufficient cooling effects cannot be obtained, resulting in a temperature rise in the neighboring area of the electrodes up to 130 or 140° C.

The electrode terminals of the discharge tubes are normally soldered and fixed to a wire harness for power supply. The soldering position is normally located in the vicinity of the heat conductive members or within the heat conductive members. When the soldering position has a high temperature, alloy crystals having 2 phases of Sn—Pb develop in the soldering position. When a stress exits between the harness and the discharge tubes, cracks develop on the grain boundaries among the alloy crystal grains, resulting in a rupture (also referred to as a creep phenomenon). The temperature at which the creep phenomenon occurs is referred to as a creep temperature.

As a means for maintaining a constant level of luminance, the concentration of the mercury gas within the discharge tubes can be made uniform. Since the concentration of the mercury gas varies depending on the temperature of the discharge tubes, the discharge tubes should be partially cooled so as to stabilize the luminance.

More specifically, a heat conductive member having a heat release function is provided for the discharge tubes, so that the concentration of the mercury gas at the attachment position of the heat conductive member can be increased. With this heat conductive member, the temperature of the discharge tubes at the attachment position of the heat conductive member can be controlled to obtain the optimum concentration of the mercury gas. In this manner, the maximum amount of light emission can be constantly obtained from the discharge tubes.

With the above light source device in which the partial cooling is performed on the neighboring area of the electrodes, however, there are problems when the-neighboring area of the electrodes becomes too cold.

More specifically, in the light source device on which the local cooling is performed, the neighboring area of the electrodes that is cooled might have the lowest temperature in the discharge tubes. In such a case, the control mechanism for controlling the concentration of the mercury gas does not function at all. When the temperature of the neighboring area of the electrodes becomes equal to or lower than the inner temperature of the discharge tubes at the locally cooled location, the concentration of the mercury gas becomes highest in the neighboring area of the electrodes. With the high concentration of mercury in the vicinity of the electrodes, the mercury exhausts at a quicker rate, resulting in a reduction of life of the discharge tubes.

In another case, the heat conductive member having the heat releasing function may not be sufficient for local cooling. In such a case, the luminance becomes uneven, and the concentration of mercury becomes higher in the vicinity of the electrodes when the temperature of the neighboring area of the electrodes becomes lower than the temperature of the attachment position of the heat conductive member.

SUMMARY OF THE INVENTION

A general object of the present invention is to provide light source devices, methods of producing the light source devices, and display apparatuses in which the above disadvantages are eliminated.

A more specific object of the present invention is to provide a light source device that can increase the luminance level and maintain the luminance uniformly, thereby increasing the reliability of the device. Another specific object of the present invention is to provide a method of producing such a light source device and a display apparatus equipped with such a light source device.

The above objects of the present invention are achieved by a light source device that includes: a discharge tube; a first heat conductive member for partially cooling the neighboring area of an electrode of the discharge tube through contact with the neighboring area of the electrode of the discharge tube; and a second heat conductive member that fills the space between the first heat conductive member and the discharge tube.

With this light source device, the neighboring area of the electrode of the discharge tube can be prevented from becoming too cold, and the concentration of gas that contributes to light emission within the discharge tube can be made uniform. Thus, the luminance in the entire discharge tube can be made uniform.

The objects of the present invention are also achieved by a display apparatus that includes the above light source device and a display device illuminated by the light source device. With this display apparatus, the same effects can be obtained as with the above light source device.

The objects of the present invention are also achieved by a light source device that includes: a discharge tube; a reflector for reflecting light radiating from the discharge tube; and a plurality of spacers that are attached to the reflector and secure the discharge tube to the reflector. In this light source device, a first spacer among the plurality of spacers holds an electrode terminal of the discharge tube at a predetermined position, while a second spacer among the plurality of spacers holds a wire line connected to the discharge tube. The space surrounded by the first spacer, the second spacer, and the reflector, is filled with a heat conductive member.

With this light source device, the neighboring area of the electrode of the discharge tube can be prevented from becoming too cold, and the concentration of gas that contributes to light emission within the discharge tube can be made uniform. Thus, the luminance in the entire discharge tube can be made uniform.

The objects of the present invention are also achieved by a display apparatus that includes the above light source device and a display device illuminated by the light source device. With this display apparatus, the same effects can be obtained as with the above-light source device.

The objects of the present invention are also achieved by a light source device that includes: a plurality of discharge tubes that are arranged in parallel with one another; a wire line for power supply; and a metal plate that is caulked so as to connect the wire line and electrodes extending from the end portions of glass tubes of the discharge tubes. In this light source device, the metal plate is provided with a plurality of caulking parts for caulking the electrodes of the discharge tubes at locations corresponding to predetermined attachment locations of the discharge tubes.

With this light source device, the joining between the metal plate and the electrodes is strong, and has a high reliability. Also, as the discharge tubes are positioned by the metal plate, the distance between the discharge tubes adjacent to each other can be maintained with high precision.

The objects of the present invention are also achieved by a display apparatus that includes the above light source device and a display device illuminated by the light source device.

With this display apparatus, the joining between the metal plate and the electrodes is strong, and has a high reliability. Also, as the discharge tubes are positioned by the metal plate, the distance between adjacent discharge tubes can be maintained with high precision.

The objects of the present invention are also achieved by a method of producing a light source device, which method includes the steps of: connecting electrodes extending from the end portion of a glass tube of a discharge tube and a power supply wire line by caulking a metal plate; positioning the electrode to a first caulking part having a concave portion formed in the metal plate; positioning the wire line to a second caulking part having a concave portion formed in the metal plate; and simultaneously caulking the first caulking part and the second caulking part, thereby securing the electrode and the wire line to the metal plate.

With this method, the electrode and the wire line for power supply can be easily caulked and fixed to the metal plate.

The objects of the present invention are also achieved by a method of producing a light source device, which method includes the steps of: connecting electrodes extending from the end portions of glass tubes of discharge tubes and a power supply wire line by caulking a metal plate; positioning one of the electrodes and the wire line to a first caulking part having a concave portion formed in the metal plate; positioning the other one of the electrodes to a second caulking part having a concave portion formed in the metal plate; and simultaneously caulking the first caulking part and the second caulking part, thereby securing the electrodes and the wire line to the metal plate.

With this method, the electrodes and the wire line for power supply can be easily caulked and fixed to the metal plate.

The objects of the present invention are also achieved by a light source device that includes: a discharge tube for emitting light by causing electric discharge between electrodes provided at both ends of a glass tube; a reflector for reflecting light radiating from the discharge tube; and a heat conductive holding member for holding the end portion of the discharge tube and cooling down the discharge tube at the held position thereof. In this light source device, the heat conductive holding member covers a sputter region onto which sputtered matter is deposited inside the glass tube due to the electric discharge.

With this light source device, electric discharge between the sputter region and the reflector can be prevented, and the reliability of the light source device can be increased.

The objects of the present invention are also achieved by a display apparatus that includes: the above light source device; a display device illuminated by the light source device; and a light guide plate that receives incident light from the light source device, and guides the incident light toward the display device with a reflecting layer. In this display apparatus, the reflecting layer has a higher density in the vicinity of the sputter region in the light source device.

With this display apparatus, the luminance in the vicinity of the heat conductive holding member can be increased, and the luminance of light illuminating the display device can be made uniform.

The objects of the present invention are also achieved by a display apparatus that includes: a light source device including discharge tubes and a heat conductive member in contact with a part of the discharge tubes so as to locally cool the part of the discharge tubes; a display device illuminated by the light source device; and a holding unit for holding the display device, which holding unit is provided with a heat releasing part that is thermally connected to the heat conductive member so as to release heat from the heat conductive member.

With this display apparatus, the local cooling can be effectively performed on the discharge tubes, and the luminance in the entire discharge tubes can be stabilized.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 1:
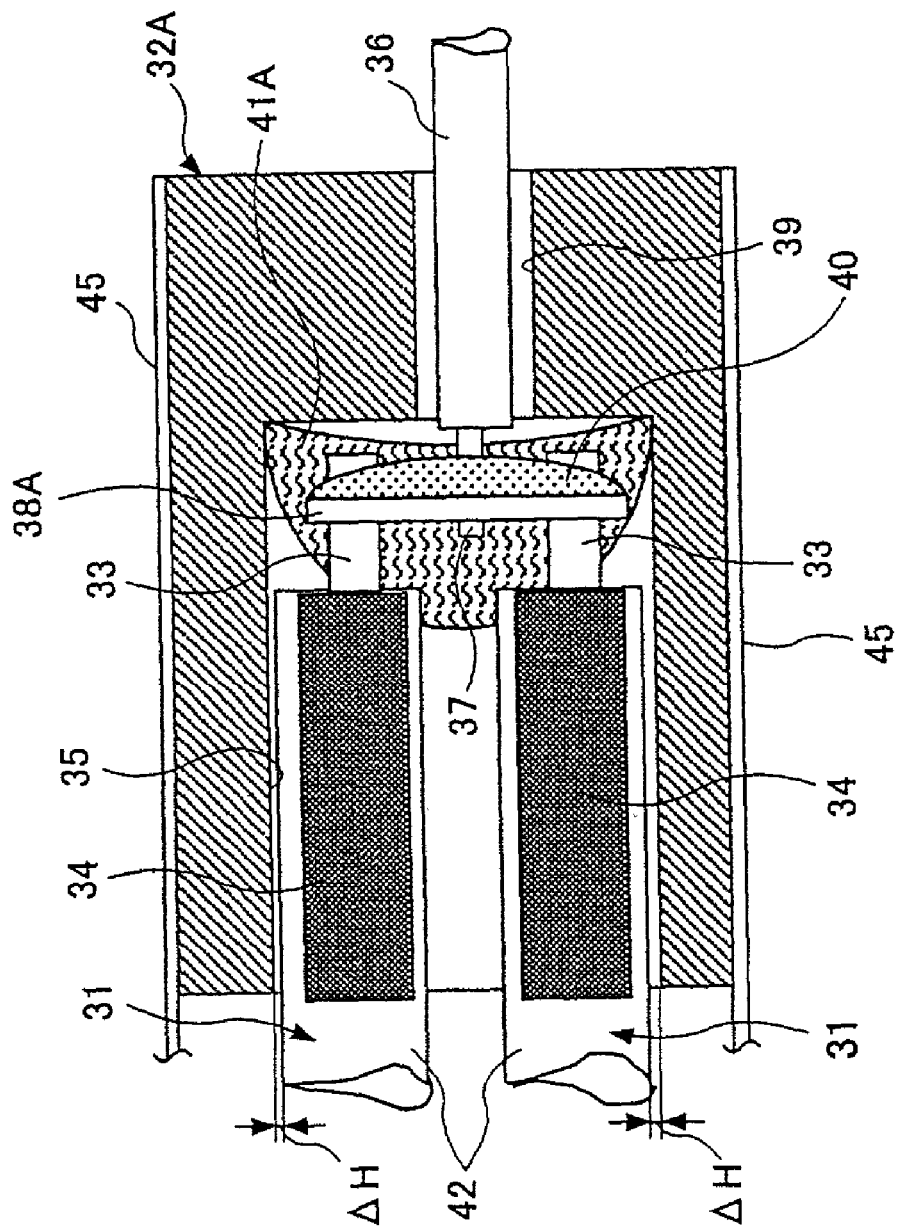
FIG. 1 is an enlarged sectional view of electrodes and the neighboring parts of discharge tubes in a light source device in accordance with a first embodiment of the present invention.
Figure 2:
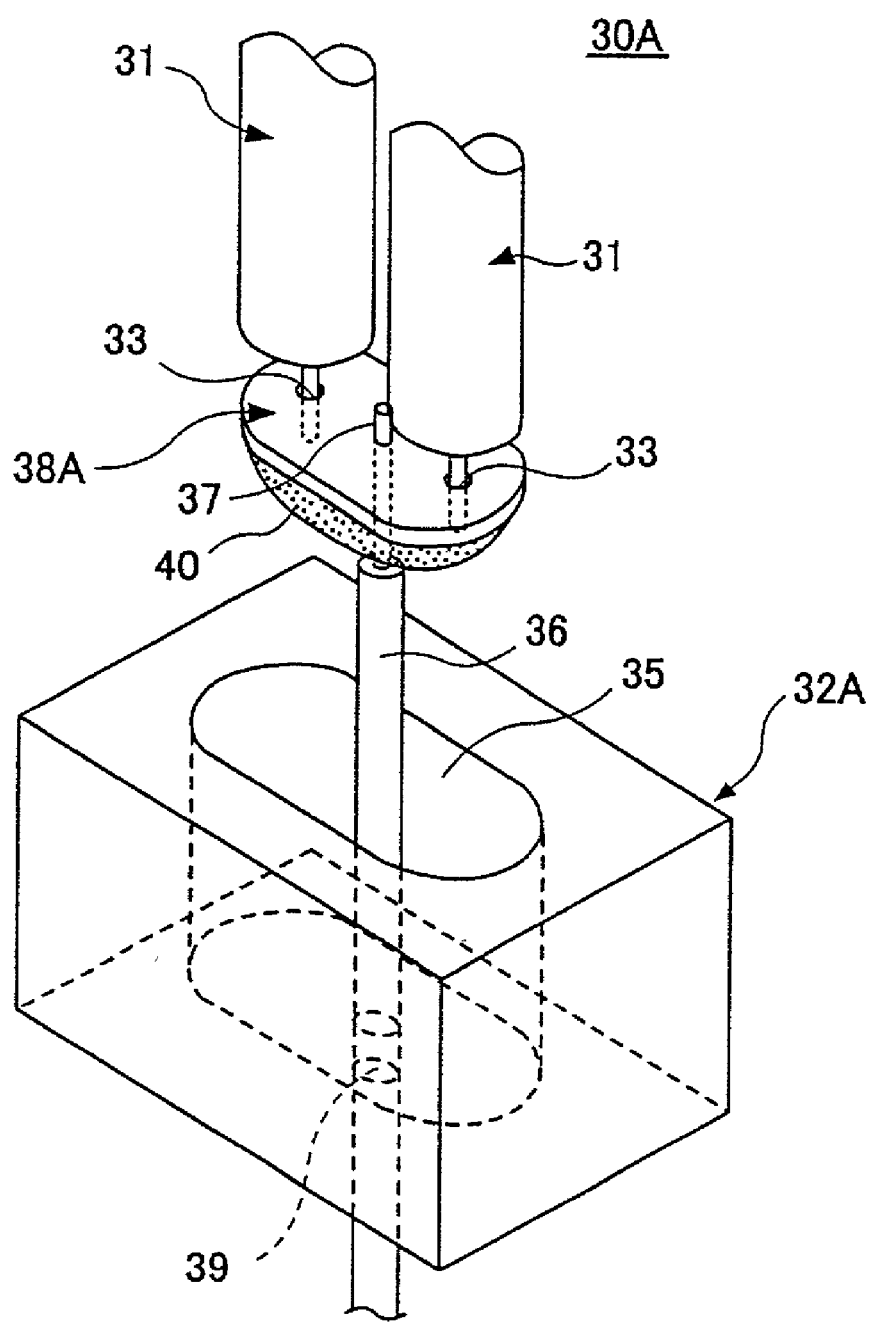
FIG. 2 is an enlarged and exploded perspective view of the electrodes and the neighboring parts of the discharge tubes in the light source device in accordance with the first embodiment of the present invention.
Figure 3:
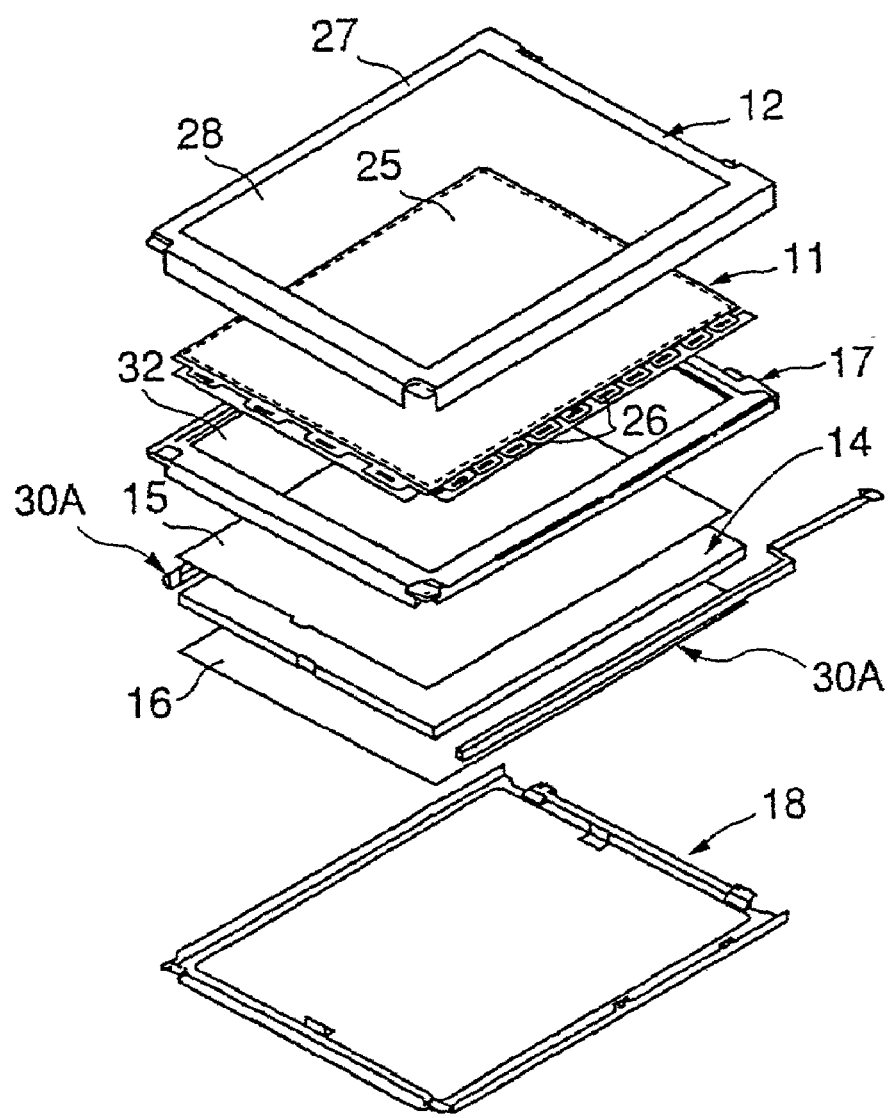
FIG. 3 is an exploded perspective view of a liquid crystal display unit in which the light source device in accordance with the first embodiment the present invention is employed.

FIGS. 1 through 3 illustrates a light source device 30A, which is a first embodiment of the present invention, and a liquid crystal display unit 10 (which is a display device) equipped with the light source device 30A.

Referring first to FIG. 3, the liquid crystal display unit 10, onto which the light source device 30A is mounted, will now be described. The liquid crystal display unit 10 includes a liquid crystal panel 11, a decorative laminate 12, a light guide plate 14, a carriage frame 17, a back face panel 18, and the light source device 30A.

The liquid crystal panel 11 includes a liquid crystal panel main body 25 that displays texts and images, and drivers 26 that surround the liquid crystal panel main body 25 and drive the liquid crystal panel main body 25. The decorative laminate 12 is placed on the liquid crystal panel 11.

The decorative laminate 12 is made of a metallic material, such as stainless steel (SUS), iron, or aluminum, or a resin material. The decorative laminate 12 is shaped like a box lid, consisting of a frame 27 and an opening 28. The decorative laminate 12 serves to reinforce the liquid crystal panel 11.

The frame 27 faces the drivers 26 surrounding the liquid crystal panel main body 25. The opening 28 faces the liquid crystal panel main body 25 of the liquid crystal panel 11.

Meanwhile, the carriage frame 17 is placed under the liquid crystal panel 11, and is made of a resin molding material such as polycarbonate, or a metallic material such as SUS or aluminum. The carriage frame 17 serves to support the liquid crystal panel 11.

The light source device 30A includes discharge tubes 31 and a reflector 45. The light source device 30A faces the side surfaces of the light guide plate 14. The discharge tubes 31 serve as the light source of the liquid crystal display unit 10, and are detachable from the reflector 45. For ease of explanation, a detailed description of the light source device 30A will be made later.

The light guide plate 14 is made of a resin material having a high transparency such as acrylic. The light guide plate 14 faces the back surface of the liquid crystal panel 11. An optical sheet 15 is placed on the side of the outer surface of the light guide plate 14 (i.e., on the side that faces the liquid crystal panel 11).

The optical sheet 15 gathers or disperses light radiating through the light guide plate 14 so as to discharge the light effectively to the liquid crystal panel 11. A reflecting sheet 16 is placed on the side of the back surface of the light guide plate 14. The reflecting sheet 16 reflects light radiating through the light guide plate 14 and returns the light back into the light guide plate 14.

The back face panel 18 accommodates the light source device 30A, the light guide plate 14, the optical sheet 15, and the reflecting sheet 16. Like the carriage frame 17, the back face panel 18 is made of a resin molding material such as polycarbonate, or a metallic material such as SUS or aluminum.

Referring now to FIGS. 1 and 2, the light source device 30A mounted onto the liquid crystal display unit 10 will be described.

As described above, the light source device 30A includes the discharge tubes 31 and the reflector 45. FIGS. 1 and 2 are enlarged views of one end of the discharge tubes 31 employed in the light source device 30A.

The discharge tubes 31 are cold cathode tubes that are formed by glass tubes 42 containing mercury sealed in Ar gas or Ne gas. A fluorescent material is applied to the walls of the glass tubes 42. The mercury gas emits ultraviolet rays during a discharging period. The ultraviolet rays impinge upon the fluorescent material so as to generate visible rays. In this embodiment, the two discharge tubes 31 each have a diameter of approximately 3 mm, and are placed in a narrow space having a width of 10 mm or shorter.

An electrode 34 is provided in both ends of each discharge tube 31. An electrode terminal 33 connected to each electrode 34 sticks out of each corresponding glass tube 42 and is soldered to a metal plate 38A by a solder 40. The terminal 37 of a wire harness 36 for power supply is also soldered to the metal plate 38A by the solder 40 in the same manner as the electrode terminals 33.

In such a structure, electric power can be supplied from the wire harness 36 to each electrode 34 of the discharge tubes 31 via the metal plate 38A. The wire harness 36 penetrates through a through hole 39 formed at the bottom of a bottomed opening 35 formed in a heat transmission member 32A, so that the wire harness 36 sticks out of the heat transmission member 32A.

The light source device 30A performs local cooling so as to even out the mercury gas concentration in the discharge tubes 31. By doing so, the luminance in the entire discharge tubes 31 is made uniform. In the light source device 30A of this embodiment, therefore, a central heat conductive member 51 is provided around the mid sections of the discharge tubes 31.

Figure 7:
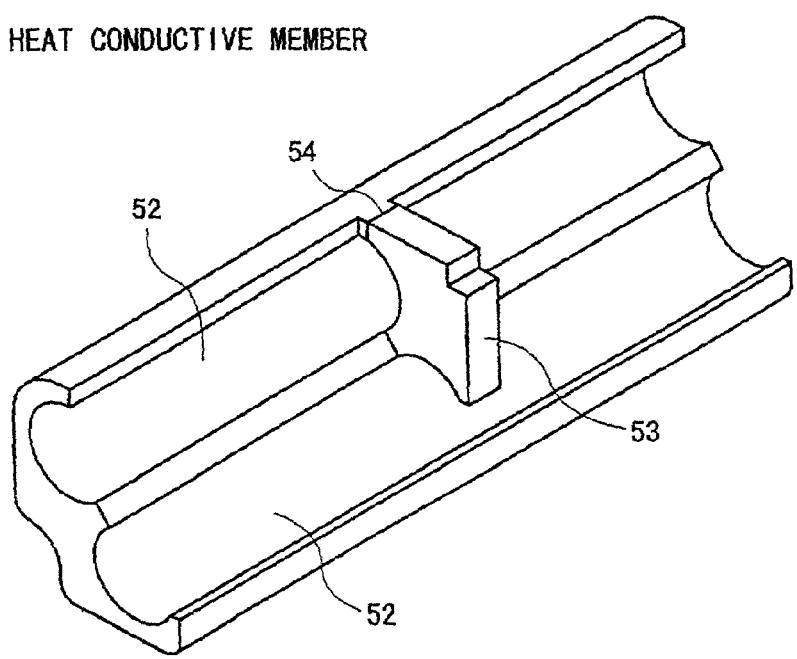
FIG. 7 is a perspective view of a central heat transmission conduction member used for explaining a local cooling operation performed for the discharge tubes.
Figure 8:
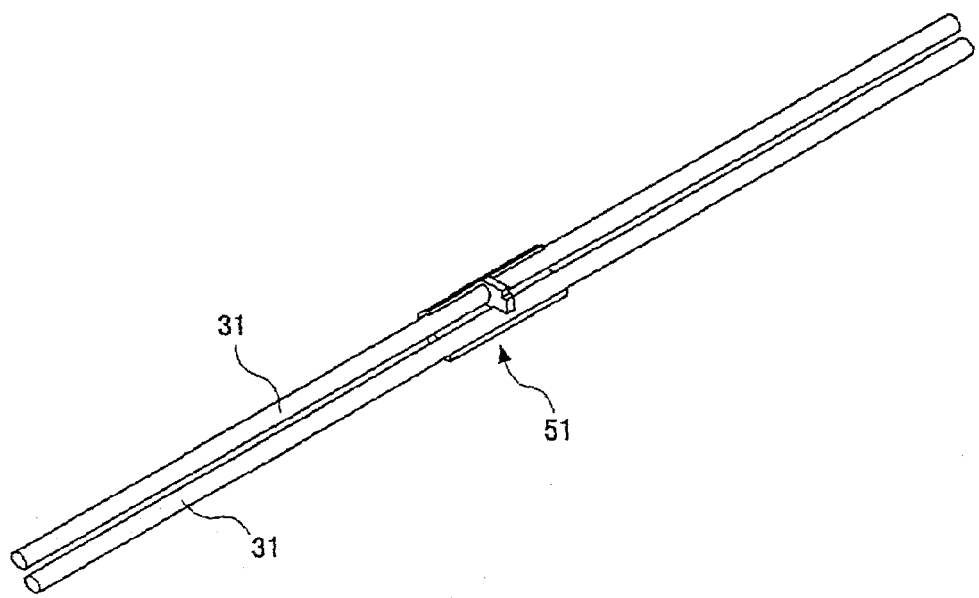
FIG. 8 is a perspective view of the central heat conductive member mounted to the discharge tubes.

FIG. 7 shows the central heat conductive member 51, and FIG. 8 illustrates a situation where the central heat conductive member 51 is attached to the discharge tubes 31. The central heat conductive member 51 is made of silicone rubber having a heat conductivity of 0.3 W/m/K, for instance, and is integrally formed by discharge tube holding parts 52 and a discharge tube engaging part 53.

The discharge tube engaging part 53 has a slit 54 so as to be flexible enough to firmly hold the discharge tubes 31. The opposite side of the discharge tube engaging part 53 from the discharge tube holding parts 52 is brought into contact with the reflector 45.

The heat generated in the discharge tubes 31 is released to the reflector 45 via the central heat conductive member 51, so that the discharge tubes 31 can be partially cooled. Also, since the attachment position of the central heat conductive member 51 on the discharge tubes 31 are cooled, the concentration of the mercury gas can be increased. Accordingly, by properly selecting the attachment position of the central heat conductive member, the concentration of the mercury gas can be made uniform in the discharge tubes 31, and the luminance of the light generated in the discharge tubes 31 can also be made uniform.

The end portions of the discharge tubes 31 are held by the reflector 45 via the heat conductive member 32A. The reflector 45 is made mainly of a metallic material, such as SUS, iron, or aluminum, and extends along the discharge tubes 31. A silver (Ag) deposition layer or a white reflecting layer is formed on the side of the reflector 45 facing the discharge tubes 31, so that the light radiating from the discharge tubes 31 can be effectively reflected. In this manner, the light radiating from the discharge tubes 31 can be effectively led toward the light guide plate 14 without being dispersed.

The heat conductive member 32A is made of silicone rubber having a heat conductivity of 0.3 W/m/K, for instance, and the bottomed opening 35 is formed at the mid section of the heat conductive, member 32A. The metal plate 38A and the discharge tubes 31 are partially attached into the bottomed opening 35.

At the time of this attachment, the bottomed opening 35 is filled with a low heat conductivity member 41A (corresponding to the second heat conductive member in claims) in advance. The low heat conductivity member 41A acts as an adhesive agent, and is made of a material having a lower heat conductivity than the heat conductive member 32A so that heat conduction does not easily occurs. More specifically, the low heat conductivity member 41A can be made of silicone room temperature vulcanization (RTV) rubber (such as SE4486 White, produced by Dow Corning Toray Silicone Co., Ltd.) or grease having the same properties.

The filling amount of the low heat conductivity member 41A can be adjusted. More specifically, the filling amount only to cover the electrode terminals 33 with the discharge tubes 31 attached to the heat conductive member 32A is set to be the minimum filling amount, so that the filing amount can be adjusted between the minimum filling amount and the maximum filling amount to fill up the bottomed opening 35. In this embodiment, the filling amount of the low heat conductivity member 41A is set to be an amount sufficient to cover the electrode terminals 33 and a part of the end portion of each glass tube 42, as shown in FIG. 1.

By filling the bottomed opening 35 with the low heat conductivity member 41A, each of the discharge tubes 31 is held by the heat conductive member 32A via the low heat conductivity member 41A. Where the low heat conductivity member 41A is not provided, each of the discharge tubes 31 is separated from the heat conductive member 32A. The separation distance between each discharge tube 31 and the heat conductive member 32A is indicated by arrows ΔH in FIG. 1.

Where the discharge tubes 31 are separated from the heat conductive member 32A, the amount of heat released from the discharge tubes 31 toward the heat conductive member 32A is small. On the other hand, where the low heat conductivity member 41A is interposed between each discharge tube 31 and the heat conductive member 32A, the amount of heat released from the discharge tubes 31 toward the heat conductive member 32A depends on the heat conductivity of the low heat conductivity member 41A.

In accordance with this embodiment, as the low heat conductivity member 41A is interposed between each discharge tube 31 and the heat conductive member 32A, the heat conductivity from the discharge tubes 31 and the heat conductive member 32A can be adjusted by the low heat conductivity member 41A. Since the low heat conductivity member 41A has a lower heat conductivity than the heat conductive member 32A as described above, the heat releasing rate of the discharge tubes 31 can be lowered, compared with a structure in which the discharge tubes 31 are directly in contact with the heat conductive member 32A.

In this manner, the neighboring area of the electrodes 34 on the discharge tubes 31 can be prevented from becoming too cold, and the concentration of the mercury gas can be made uniform in the discharge tubes 31. Accordingly, the luminance of the entire discharge tubes 31 can be made uniform.

Also, in this embodiment, the low heat conductivity member 41 is selectively made of a material having such a heat conductivity that can maintain the electrode terminals 33 of the discharge tubes 31 at a temperature lower than the melting temperature of the solder 40, which is a joining member. The electrode terminals 33 can be maintained at such a temperature by the heat release (or cooling) through the low heat conductivity member 41A.

The heat conductivity of the low heat conductivity member 41A is set in the above manner, so that the low heat conductivity member 41A can maintain the electrode terminals 33 at a temperature lower than the temperature at that the solder begins creeping. Thus, the electrode terminals 33 can be prevented from falling off the metal plate 38A, thereby increasing the reliability of the connection between each discharge tube 31 and the wire harness 36.

Further, in this embodiment, where the neighboring areas of the electrodes 34 in which the discharge tubes 31 (hereinafter referred to as "electrode areas") are in contact with the heat conductive member 32A is set at a temperature T1 (hereinafter referred to as "electrode temperature T1"), the heat conductivity of the low heat conductivity member 41A is set so that the electrode temperature T1 is not lower than the temperature T2 (T1≧T2) of the coldest parts of the discharge tubes 31 other than the electrode positions (hereinafter referred to as "low temperature parts").

More specifically, as shown in FIGS. 7 and 8, the low temperature parts of the discharge tubes 31 are the attachment position of the central heat conductive member 51. For this reason, the heat conductivity of the low heat conductivity member 41A is set so that the electrode temperature T1 is higher than the temperature T2 of the low temperature parts. As the central heat conductive member 51 and the heat conductive member 32A are made of the same material in this embodiment, the heat conductivity of the low heat conductivity member 41A is set lower than the heat conductivity of the central heat conductive member 51 or the heat conductive member 32A so as to maintain the electrode temperature T1 higher than the temperature T2 of the low temperature parts.

As described above, the concentration of the mercury gas in the discharge tubes 31 is characteristically higher in the low temperature parts and is lower in the high temperature parts. Accordingly, the above structure can prevent the concentration of the mercury gas that contributes to light emission from becoming high in the vicinity of the electrodes 34. Thus, the luminance of light radiating from the discharge tubes 31 can be stabilized.

Figure 4:
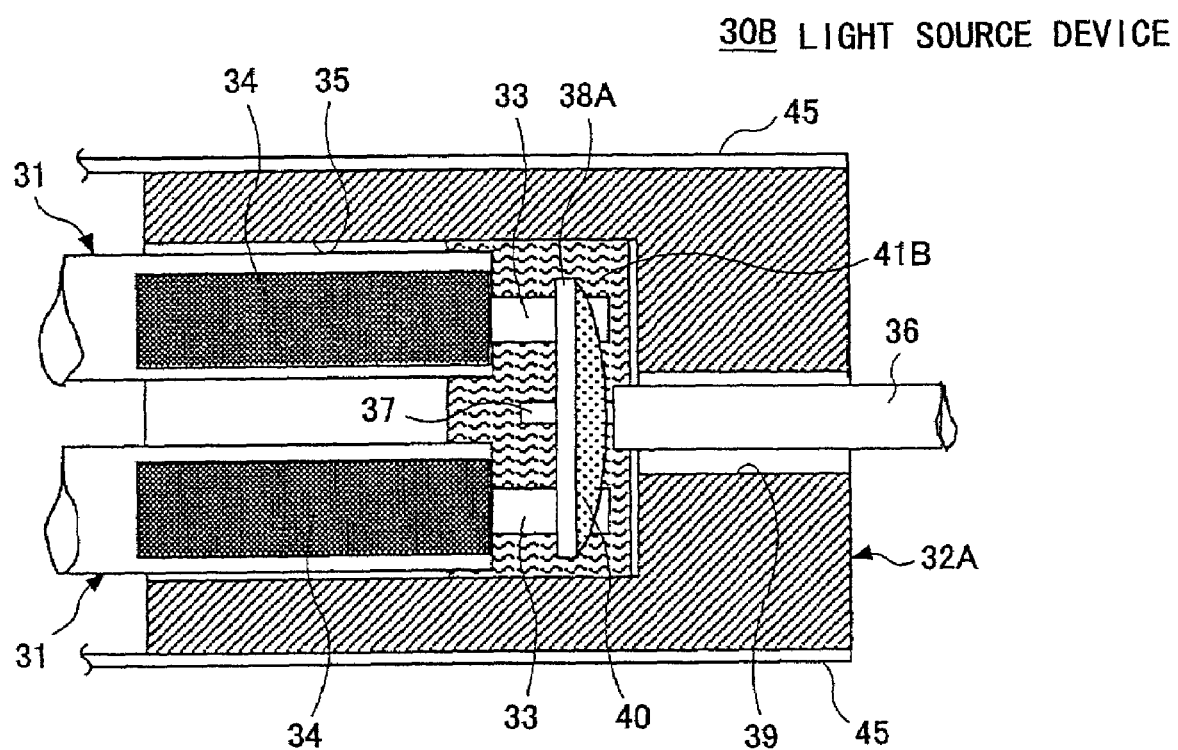
FIG. 4 is an enlarged sectional view of electrodes and the neighboring parts of discharge tubes in a light source device in accordance with a second embodiment of the present invention.

Referring now to FIG. 4, a second embodiment of the present invention will be described.

FIG. 4 shows a light source device 30B in accordance with the second embodiment of the present invention. In FIG. 4, the same components as in FIGS. 1 through 3 are denoted by the same reference numerals as in FIGS. 1 through 3, and explanations for those components are omitted from the description below. The same applied to the descriptions of all other embodiments that will follow this embodiment.

The light source device 30B according to this embodiment is characterized by having the bottomed opening 35 filled with a low heat conductivity member 41B made of a silicone oil compound (such as G750 having a heat conductivity of 1.5 W/K/m, produced by Dow Corning Toray Silicone Co., Ltd.), instead of the low heat conductivity member 41A employed in the light source device 30A according to the first embodiment.

This silicone oil compound has a higher (Note: Should not this be "lower"?) viscosity, compared with the silicone RTV rubber that forms the low heat conductivity member 41A used in the first embodiment. When the discharge tubes 31 and the metal plate 38A are set in the bottomed opening 35, the electrode terminals 33 and the end portions of the electrodes 34 can be easily inserted into the low heat conductivity member 41B.

In this structure, the discharge tubes 31 can be easily set in the heat conductive member 32A, and the workability can be increased. Also, excessive external force is not applied to the wire harness 36 at the time of the attachment of the discharge tubes 31, thereby preventing the wire harness 36 from breaking.

Furthermore, as the low heat conductivity member 41B has a high fluidity, the contact ability with the discharge tubes 31, the electrode terminals 33, and the metal plate 38A can be improved. The silicone oil compound is left to harden at room temperature. After the hardening, the low heat conductivity member 41B holds the discharge tubes 31 and other components within the heat conductive member 32A.

Figure 5:
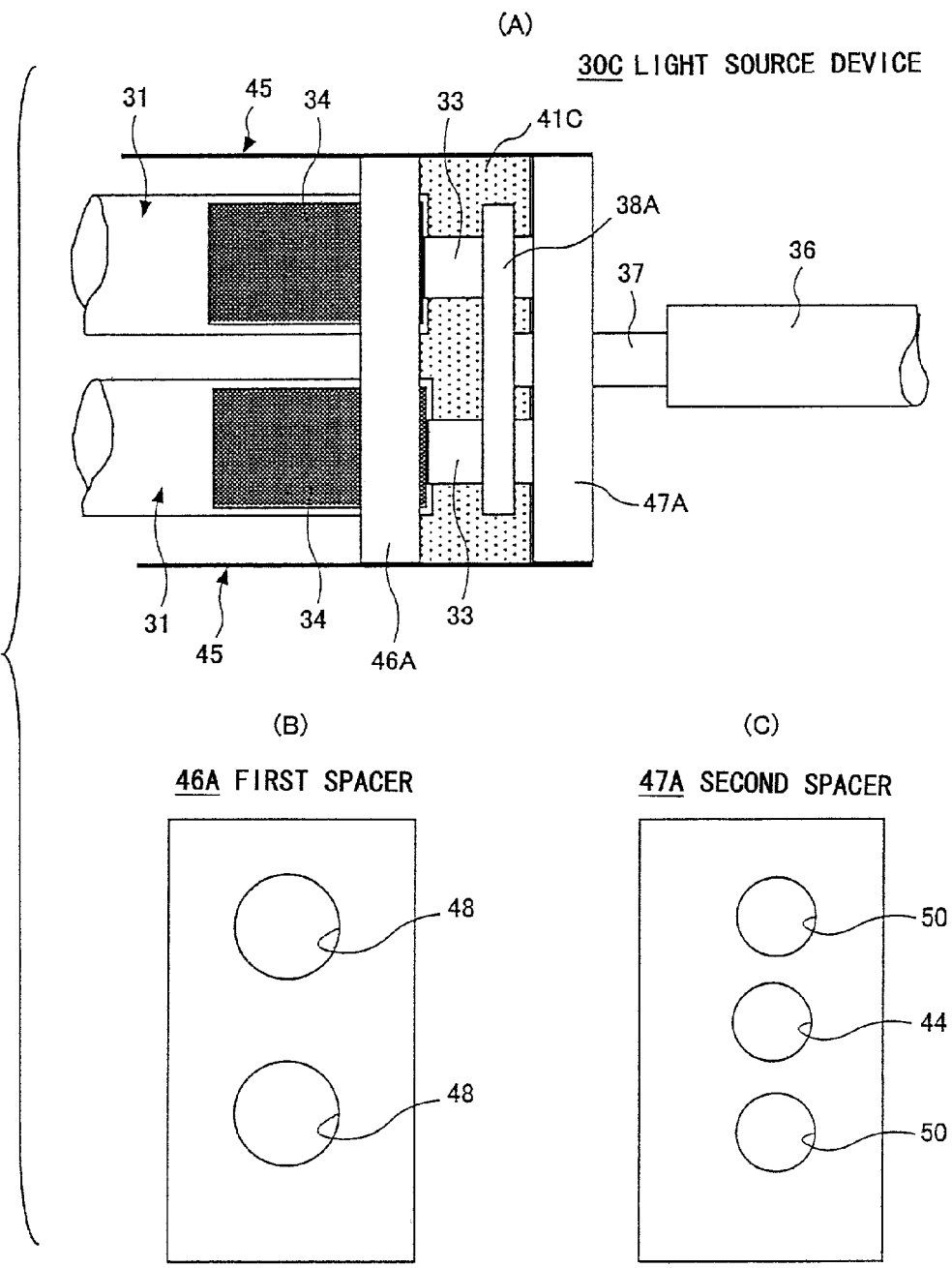
FIGS. 5A through 5C illustrate a light source device in accordance with a third embodiment of the present invention.

Referring now to FIGS. 5A through 5C, a third embodiment of the present invention will be described.

FIGS. 5A through 5C illustrate a light source device 30C in accordance with the third embodiment of the present invention. The light source device 30C according to this embodiment does not employ the heat conductive member 32A used in the first and second embodiments. Instead, the discharge tubes 31 are fixed to the reflector 45 by a first spacer 46A, and the wire harness 36 is also fixed to the reflector 45 by a second spacer 47A. Furthermore, a low heat conductivity member 41C fills the space between the first spacer 46A and the second spacer 47A.

The first spacer 46A and the second spacer 47A are plate-like members formed by molding silicone resin, for instance. As shown in FIG. 5B, the first spacer 46A has two holding holes 48 into which the discharge tubes 31 are inserted and held therein. As shown in FIG. 5C, the second spacer 47A has holding holes 50 into which the electrode terminals 33 are inserted and held therein, and a through hole 44 into which the terminal 37 of the wire harness 36 is inserted.

The discharge tubes 31 and the reflector 45 are positioned by engaging the first spacer 46A into the reflector 45. The second spacer 47A is also engaged into the reflector 45, so that the wire harness 36 is held by the reflector 45 via the second spacer 47A.

The space formed between the first spacer 46A and the second spacer 47A is filled with the low heat conductivity member 41C with the aid of a dispenser, for instance. The low heat conductivity member 41C acts as an adhesive agent, and is made of silicone RTV rubber, such as SE4486, produced by Dow Corning Toray Silicone Co., Ltd.

The low heat conductivity member 41 is selectively made of a material having a lower heat conductivity than the reflector 45. Accordingly, the heat conduction from the discharge tubes 31 toward the reflector 45 can be controlled by the low heat conductivity member 41C.

As the low heat conductivity member 41C has a lower heat conductivity than the reflector 45, the heat releasing rate of the discharge tubes 31 can be made lower, compared with a structure in which the discharge tubes 31 are directly in contact with the reflector 45. In this manner, the neighboring areas of the electrodes 34 on the discharge tubes 31 can be prevented from becoming too cold, and the concentration of the mercury gas in the discharge tubes 31 can be made uniform. Thus, the luminance in the entire discharge tubes 31 can be also made uniform.

Also, in this embodiment, the heat conductivity of the low heat conductivity member 41C is set so that the electrode temperature T1 at the contact parts between the low heat conductivity member 41A and the neighboring areas of the electrodes of the discharge tubes 31 becomes higher than the lower temperature T2 of the above mentioned low temperature parts (T1>T2). In this structure, the gas concentration of the mercury gas that contributes to light emission can be prevented from becoming high in the vicinity of the electrodes 34, as in the first embodiment. Thus, the luminance of light radiating from the discharge tubes 31 can be stabilized.

Figure 6:
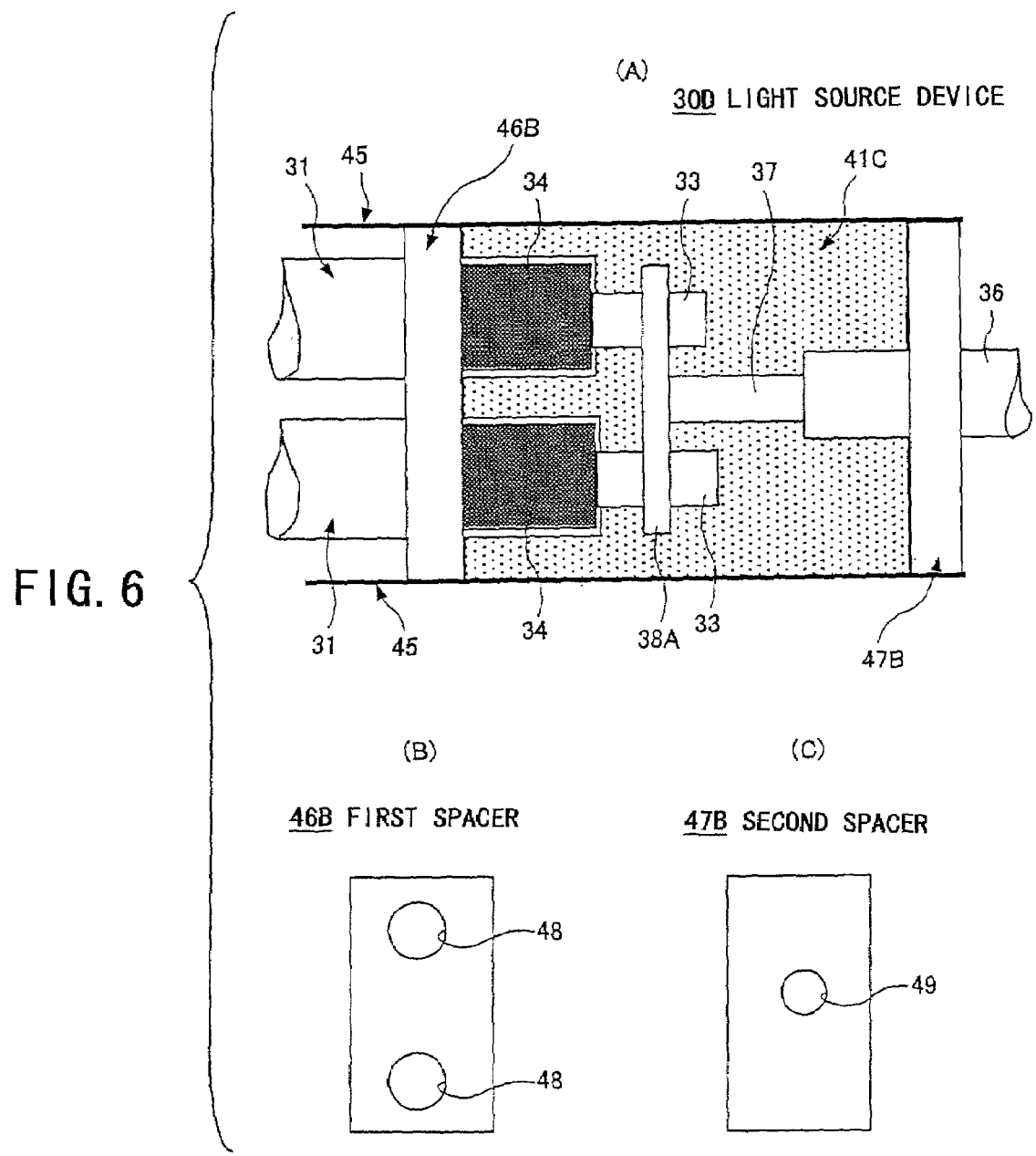
FIGS. 6A through 6C illustrate a light source device in accordance with a fourth embodiment of the present invention.

Referring now to FIGS. 6A through 6C, a fourth embodiment of the present invention will be described.

FIGS. 6A through 6C illustrate a light source device 30D in accordance with the fourth embodiment of the present invention. Like the light source device 30C according to the third embodiment, the light source device 30D according to this embodiment does not employ the heat conductive member 32A used in the first and second embodiments. Instead, a first spacer 46B and a second spacer 47B are employed to hold the discharge tubes 31 and the wire harness 36. Also, the low heat conductivity member 41C fills the space between the first spacer 46B and the second spacer 47B.

As shown in FIG. 6B, the first spacer 46B is the same as the first spacer 46A employed in the light source device 30C according to the third embodiment, but the position for holding the discharge tubes 31 is shifted to the left, as shown in FIG. 6A, compared with the light source device 30C. In FIG. 6A, the first spacer 46B is located on the left side of the electrodes 34. Meanwhile, the second spacer 47B has only one holding hole 49 for holding the wire harness 36, as shown in FIG. 6C.

The space between the first spacer 46B and the second spacer 47B is filled with the low heat conductivity member 41C, as in the third embodiment. The material and properties of the low heat conductivity member 41C are the same as described in the description of the third embodiment. Unlike the light source device 30C according to the third embodiment, a part of the wire harness 36 (not the terminal 37) can also be secured by the low heat conductivity member 41C that acts as an adhesive agent in the light source device 30D according to the fourth embodiment. In this structure, even when external force such as pulling force is applied to the wire harness 36 from the right direction in FIG. 6A, the terminal 37 of the wire harness 36 can be prevented from falling off the metal plate 38A, because the wire harness 36 is secured by the low heat conductivity member 41C.

The electric connection between the discharge tubes 31 and the wire harness 36 will be hereinafter described.

Figure 9:
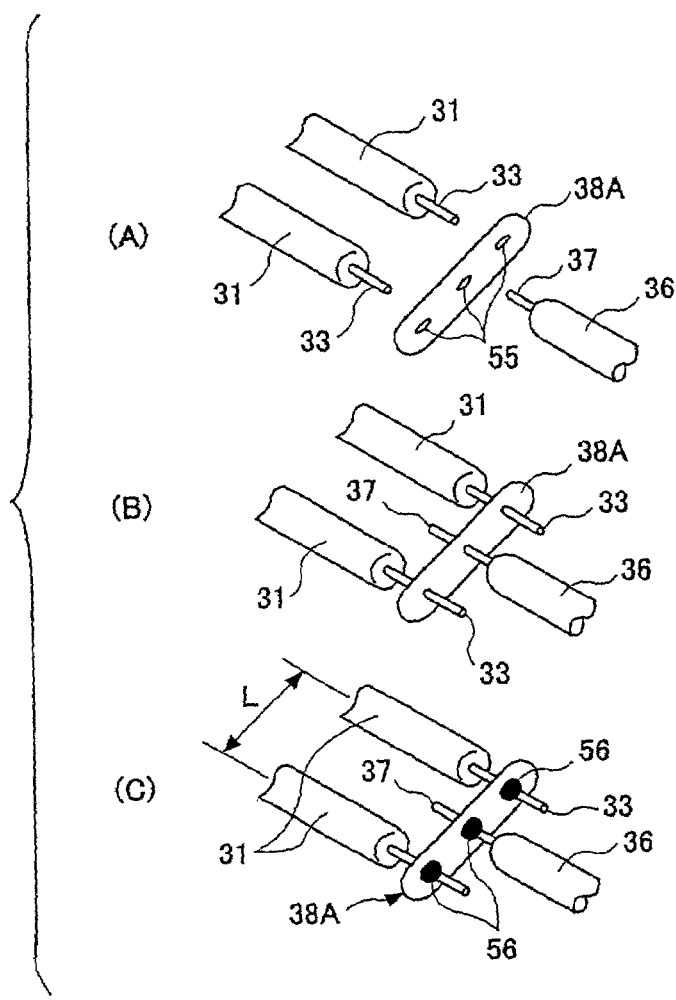
FIGS. 9A through 9C illustrate a common structure of connection between the wire harness and the discharge tubes.

FIGS. 9A through 9C illustrate a common connection structure between the discharge tubes 31 and the wire harness 36. Basically, the connection structure is commonly employed in the light source devices 30A through 30D according to the first embodiment through the fourth embodiment described so far. As shown in FIG. 9A, the metal plate 38A having three holes 55 is prepared in this connection structure. As shown in FIG. 9B, the electrode terminals 33 of the discharge tubes 31 and the terminal 37 of the wire harness 36 are inserted into the respective holes 55. As shown in FIG. 9C, the electrode terminals 33 and the terminal 37 are then joined to the metal plate 38A with solders 56 at the respective insertion positions, thereby electrically connecting the terminal 37 to the electrode terminals 33 via the metal plate 38A.

Figure 10:
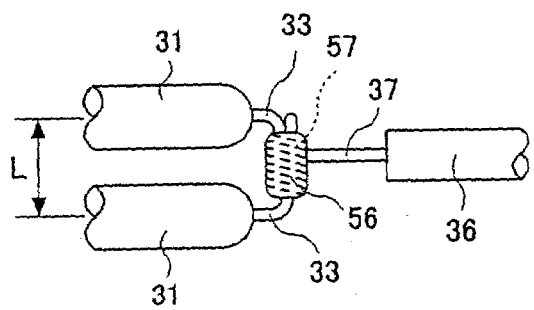
FIG. 10 illustrates another common structure of connection between the wire harness and the discharge tubes.

FIG. 10 illustrates another connection structure between the discharge tubes 31 and the wire harness 36. In this structure, the electrode terminals 33 are bent at right angle, and the bent parts are temporarily held by metallic coils 57. The solder 56 is applied over the metallic coils 57, so that the terminal 37 of the wire harness 36 is electrically connected to the electrode terminals 33 of the discharge tubes 31.

In the above connection structure, however, when the temperature of the connection part provided with the solder 56 rises with time to 120 degrees centigrade, which is approximately the melting temperature of the solder 56, the long-term reliability of the device decreases due to the poor strength or a creeping phenomenon of the solder 56 (the joining part). Here, the creeping phenomenon of the solder 56 refers to a situation where the solder 56 breaks due to a decrease of strength at the boundaries between crystals caused by recrystallization in the solder 56 that has become uneven after the soldered part has been left at a high temperature.

FIGS. 11A through 11C illustrate connection structures between the discharge tubes 31 and the wire harness 36, which have been developed to solve the above problem. In these connection structures, the discharge tubes 31 and the wire harness 36 are connected without the solder 56. Instead, caulking metal fittings 58 are employed to mechanically connect the discharge tubes 31 and the wire harness 36.

In the connection structure shown in FIG. 11A, the terminal 37 that is made up of thin copper wires is divided into two branches, and the two branches of the terminal 37 are caulked and fixed to the respective electrode terminals 33 with the caulking metal fittings 58. In the connection structure shown in FIG. 11B, two lead wires 59 are caulked and fixed to the terminal 37 of the wire harness 36 with one of the caulking metal fittings 58, while being caulked and fixed to the respective electrode terminals 33 with the other caulking metal fittings 58.

In the connection structure shown in FIG. 1C, one of the electrode terminals 33 and one end of a lead wire 59 are caulked and fixed to the terminal 37 of the wire harness 36 with one of the caulking metal fittings 58, while the other end of the lead wire 59 is caulked and fixed to the other one of the electrode terminals 33. In these connection structures employing the caulking metal fittings 58, as the electrode terminals 33 and the terminal 37 of the wire harness 36 are mechanically connected, the connection strength does not decrease even when the environmental temperature rises.

Figure 11:
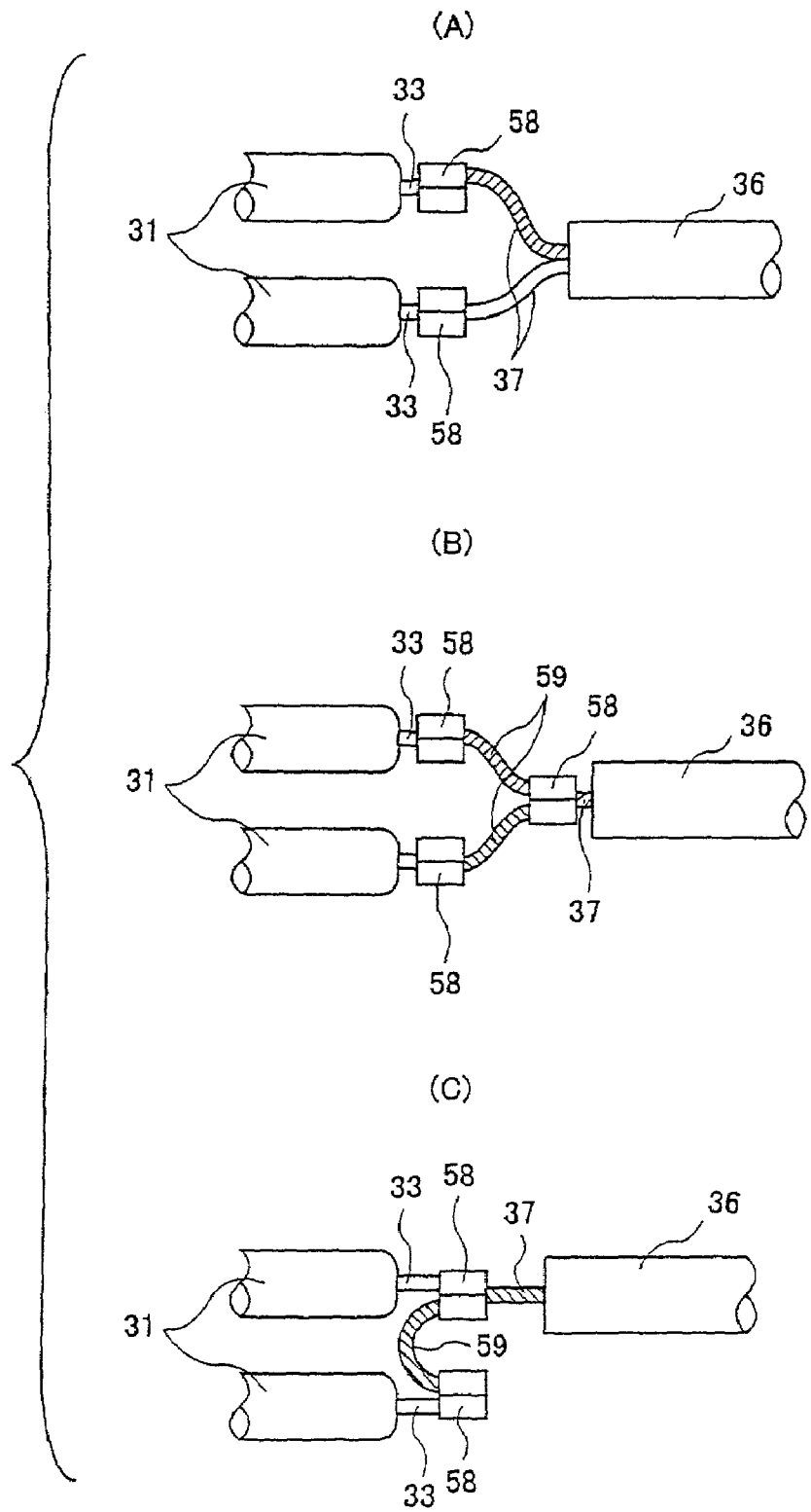
FIGS. 11A through 11C illustrate other common structures of connection between the wire harness and the discharge tubes.

In the connection structures shown in FIGS. 10 through 11C, however, there is a problem that the two discharge tubes 31 cannot be maintained at a fixed distance. In the connection structure shown in FIG. 10, there is also the problem of the breaking of the solder 56 that has already been described above.

In the connection structure shown in FIGS. 9A through 9C, on the other hand, as the electrode terminals 33 are inserted into the holes 55 of the metal plate 38A, the discharge tubes 31 are positioned by the holes 55 of the metal plate 38A. Accordingly, the distance L between the two discharge tubes 31 can be fixed.

In the connection structure shown in FIG. 10, the distance L between the two discharge tubes 31 varies depending on the overlapping parts of the bent parts of the electrode terminals 33 inside the metallic coils 57. In the connection structures shown in FIGS. 11A through 11C, the distance L between the two discharge tubes 31 varies as the terminal 37 and the lead wires 59 are deformed.

As described above, the discharge tubes 31 are set in a narrow area having a width less than 10 mm. Therefore, the two discharge tubes 31 should be positioned at a fixed distance from each other, and set in the narrowest possible area. If the distance L between the two discharge tubes 31 varies, the discharge tubes 31 might be brought into direct contact with the reflector 45, which will cause a problem. Furthermore, a larger space is required for connection where the distance L between the discharge tubes 31 varies. This will cause difficulties in incorporating the connection structure into smaller and thinner light source devices for which there is an increasing demand these days.

Referring now to FIGS. 12A and 12B, a fifth embodiment of the present invention will be described.

Figure 12:
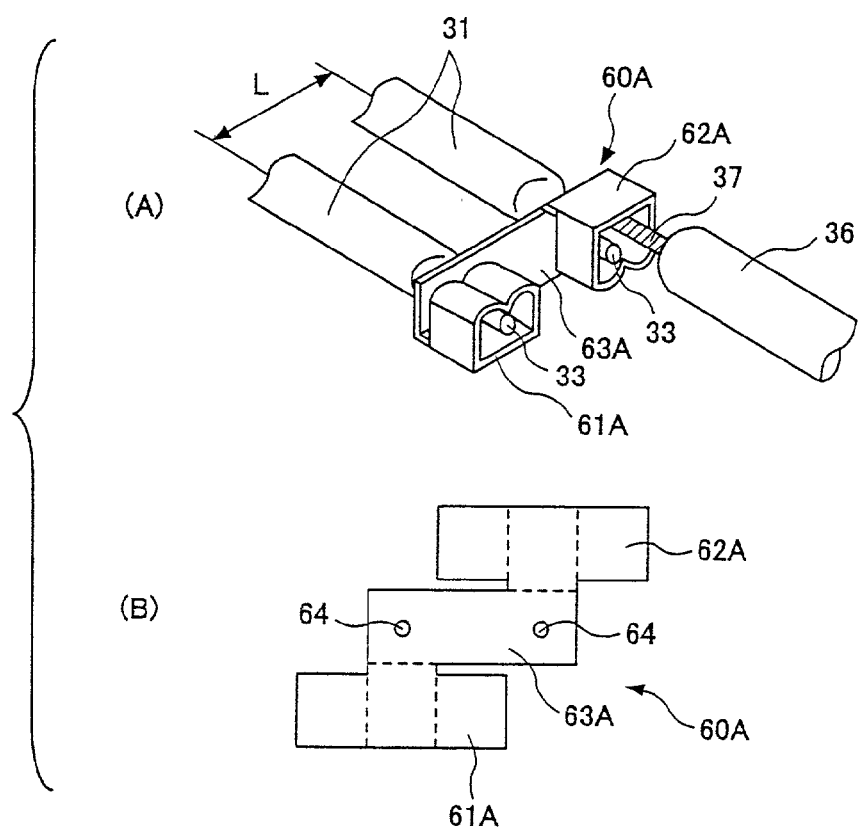
FIG. 12A is an enlarged perspective view of main parts in the vicinity of the metal plate in a light source device in accordance with a fifth embodiment of the present invention.
FIG. 12B is a development elevation of the metal plate employed in the light source device in accordance with the fifth embodiment of the present invention.
Figure 13:
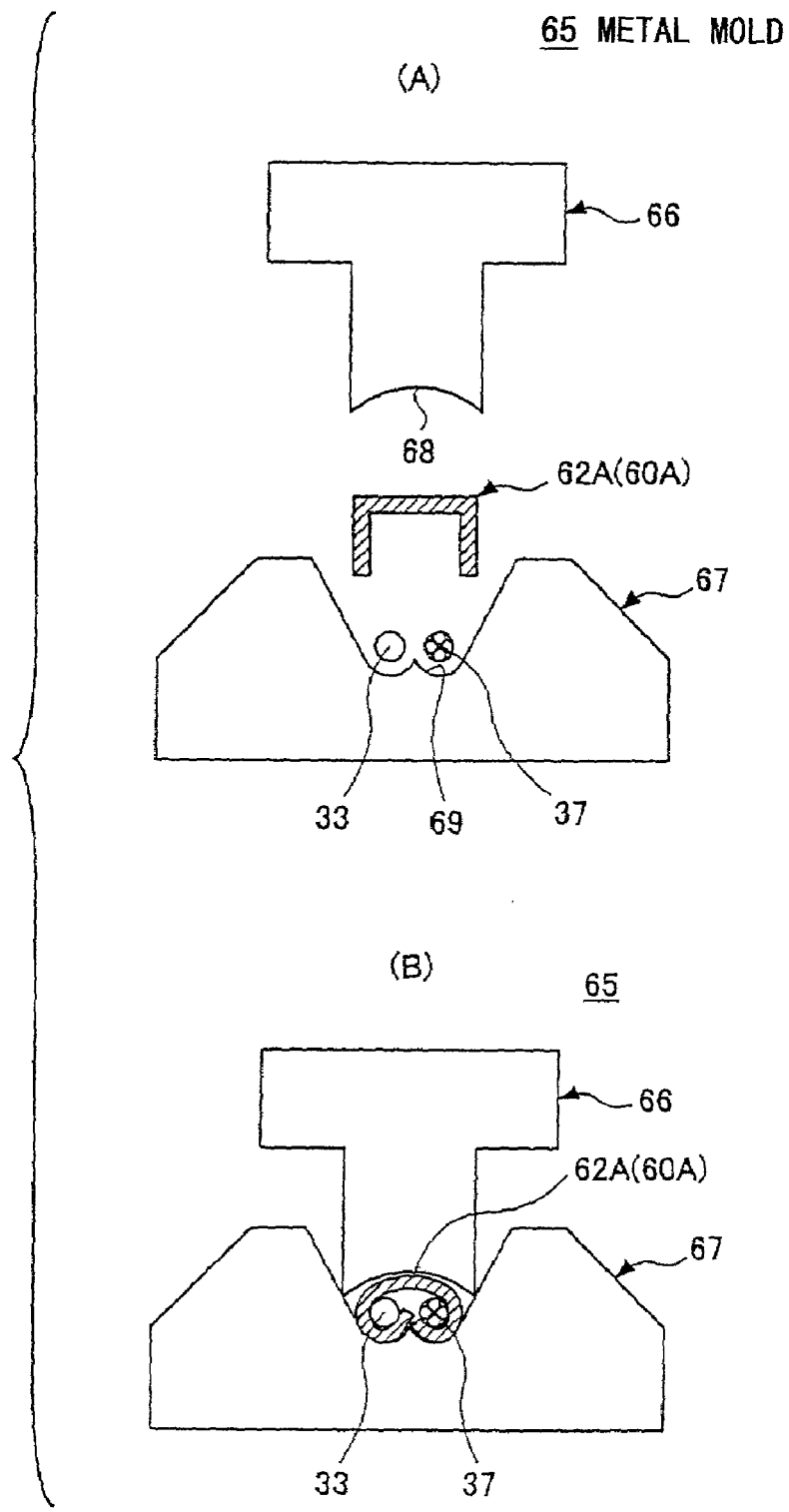
FIGS. 13A and 13B illustrate an assembling process of the light source device shown in FIGS. 12A and 12B.
Figure 14:
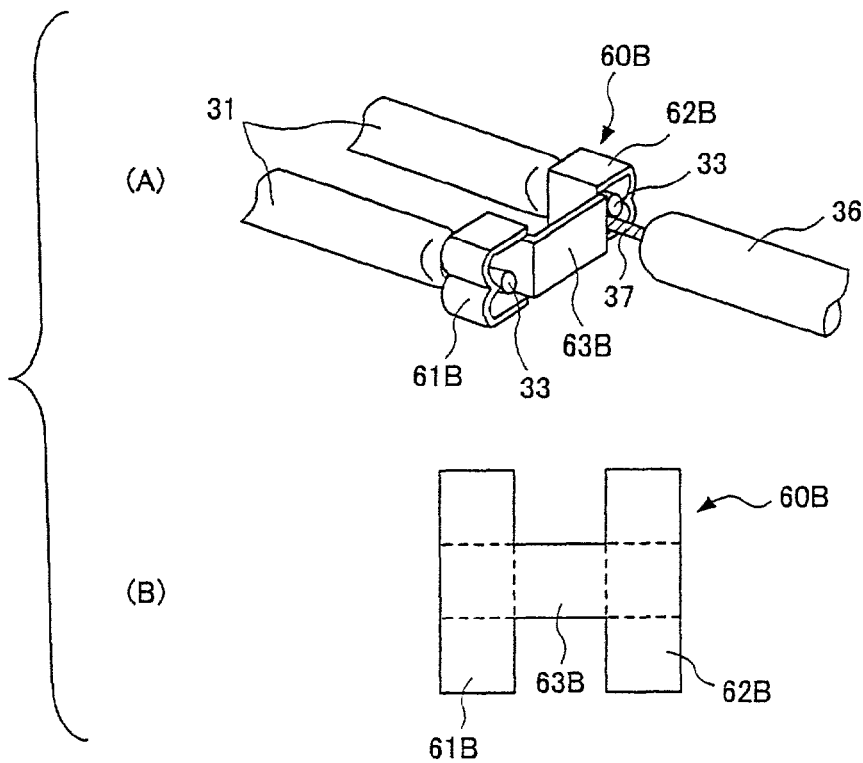
FIG. 14A is an enlarged perspective view of the main parts in the vicinity of the metal plate in a light source device in accordance with a sixth embodiment of the present invention.
FIG. 14B is a plan view of the metal plate in a developed state in the light source device in accordance with the sixth embodiment of the present invention.
Figure 15:
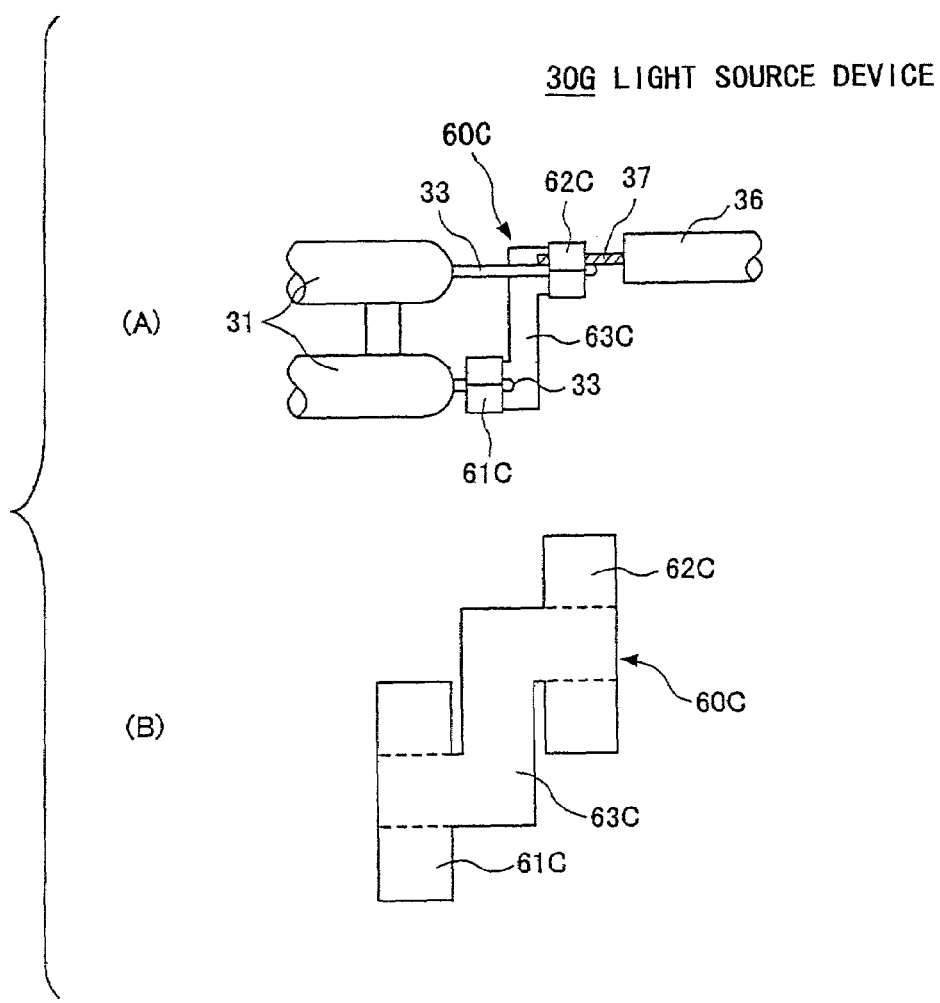
FIG. 15A is an enlarged plan view of the main parts in the vicinity of the metal plate in a light source device in accordance with a seventh embodiment of the present invention.
FIG. 15B is a plan view of the metal plate in a developed state in the light source device in accordance with the seventh embodiment of the present invention.
Figure 16:
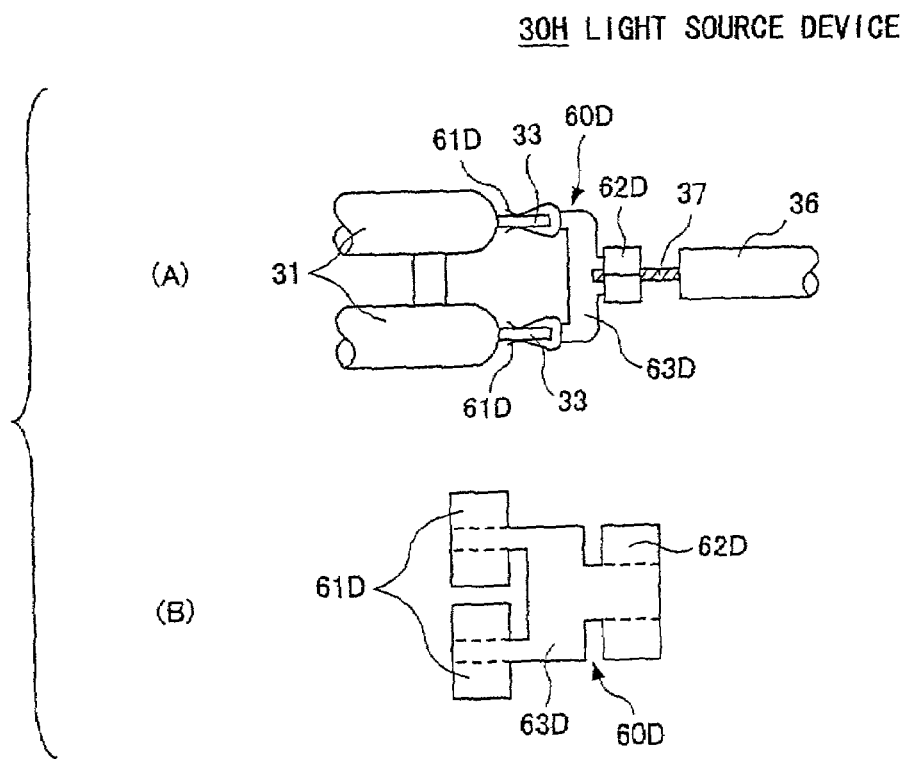
FIG. 16A is an enlarged plan view of the main parts in the vicinity of the metal plate in a light source device in accordance with an eighth embodiment of the present invention.
FIG. 16B is a plan view of the metal plate in a developed state in the light source device in accordance with the eighth embodiment of the present invention.

FIGS. 12A and 12B illustrate a light source device 30E in accordance with the fifth embodiment of the present invention. It should be noted that the following embodiments that will be hereinafter described with reference to FIGS. 12A through 22 have been developed to solve the problems with the connection structures between the terminal 37 and the electrode terminals 33 described above.

The light source device 30E according to the fifth embodiment has the two discharge tubes 31, and each of the electrode terminals 33 provided to the discharge tubes 31 is connected to the terminal 37 of the wire harness 36. This embodiment is characterized by a metal plate 60A that is employed for connecting the discharge tubes 31 and the wire harness 36 and has a development elevation as shown in FIG. 12B. The broken lines in FIG. 12B indicate folding lines.

The metal plate 60A is integrally formed by a first caulking part 61A, a second caulking part 62A, and a base part 63A. The two discharge tubes 31 are position in parallel with each other and set to the metal plate 60A. The electrode terminal 33 of one of the discharge tubes 31 is caulked with the first caulking part 61A, while the electrode terminal 33 of the other one of the discharge tubes 31 and the terminal 37 of the-wire harness 36 are both caulked with the second caulking part 62A.

Further, a pair of positioning holes 64 are formed in the base part 63A that interconnects the first caulking part 61A and the second caulking part 62A. The electrode terminals 33 of the discharge tubes 31 are inserted into the positioning holes 64.

FIGS. 13A and 13B illustrate the process for caulking the second caulking part 62A of the metal plate 62A. As shown in the figures, a metal mold 65 is employed for caulking the second caulking part 62A of the metal plate 60A. The metal mold is made up of an upper mold 66 and a lower mold 67. The upper mold 66 has a curved molding part 68, while the lower mold 67 has a concave part 69 for accommodating the one of the electrode terminals 33 and the terminal 37.

To conduct the calking process, one of the electrode terminals 33 and the terminal 37 are placed in the concave part 69 of the lower mold 67, as shown in FIG. 13A, and the second caulking part 62A is then interposed between the upper mold 66 and the lower mold 67. In this position, the upper mold 66 is pressed against the lower mold 67 so that the electrode terminal 33 and the terminal 37 are caulked with the second caulking part 62A, as shown in FIG. 13B, and are mechanically and electrically connected to each other.

Although the caulking process of the second caulking part 62A of the metal plate 60A is shown in FIGS. 13A and 13B, the electrode terminal 33 of the other one of the discharge tubes 31 is caulked with the first caulking part 61A at the same time as the caulking of the second caulking part 62A. As the caulking process is simultaneously conducted for the first caulking part 61A and the second caulking part 62A, the effectiveness of the caulking process can be increased.

In the above manner, the electrode terminals 33 of the discharge tubes 31 and the terminal 37 of the wire harness 36 are caulked with the first caulking part 61A and the second caulking part 62A of the metal plate 60A through a mechanical process. Accordingly, the joining strength among the discharge tubes 31, the terminal 37, the first caulking part 61A, and the second caulking part 62A, is great enough to prevent the discharge tubes 31 and the terminal 37 from falling off the metal plate 60A, even when the environmental temperature rises. Thus, the reliability of the light source device 30E can be increased.

The positions of the first caulking part 61A and the second caulking part 62A of the metal plate 60A correspond to the positions of the electrode terminals 33 of the discharge tubes 31 placed in parallel with each other. Accordingly, the discharge tubes 31 can be positioned by the metal plate 60A by caulking the discharge tubes 31 to the metal plate 60A. Particularly, since the positioning holes are formed in the base part 63A in this embodiment, the electrode terminals 33 are inserted into the positioning holes 64 so that the discharge tubes 31 can be positioned with higher precision. In this manner, the distance L between the two discharge tubes 31 can be maintained with high precision, while the connection between the terminal 37 and the electrode terminals 33 requires a small space.

In this embodiment, the electrode terminal 33 of one of the discharge tubes 31 and the terminal 37 of the wire harness 36 are simultaneously caulked with the second caulking part 62A. By doing so, the total number of caulking parts can be reduced, compared with a structure in which the terminal 37 is caulked through an independent process. Accordingly, the metal plate 60A and the light source device 30E can be made smaller.

Referring now to FIGS. 14A and 14B, a sixth embodiment of the present invention will be described.

FIGS. 14A and 14B illustrate a light source device 30F in accordance with the sixth embodiment of the present invention. This embodiment is characterized by the use of a metal plate 60B for connecting the discharge tubes 31 and the wire harness 36. A development elevation of the metal plate 60B is shown in FIG. 14B. The broken lines in FIG. 14B indicate folding lines.

The metal plate 60B includes a first caulking part 61B and a second caulking part 62B, which is a similar to the structure according to the fifth embodiment. The first caulking part 61B and the second caulking part 62B are both bent at right angles with respect to a base part 63B. Such a metal plate 60B according to this embodiment takes only a small area, and the light source device 30F can therefore be made smaller.

Referring now to FIGS. 15A and 15B, a seventh embodiment of the present invention will be described.

FIGS. 15A and 15B illustrate a light source device 30G in accordance with the seventh embodiment of the present invention. This embodiment is characterized by the use of a metal plate 60C for connecting the discharge tubes 31 and the wire harness 36. A development elevation of the metal plate 60C is shown in FIG. 15B. The broken lines in FIG. 15B indicate the folding lines.

The metal plate 60C includes a first caulking part 61C and a second caulking part 62C, which is similar to the structure of the fifth and sixth embodiments. In this metal plate 60C, a base part 63C that interconnects the first caulking part 61C and the second caulking part 62C is Z-shaped. In such a structure, the first caulking part 61C and the second caulking part 62C are shifted from each other in both the horizontal direction and the vertical direction in FIG. 15B, so that the two caulking parts 61C and 62C can be simultaneously caulked on the same plane. Accordingly, the caulking process can be simplified.

Referring now to FIGS. 16A and 16B, an eighth embodiment of the present invention will be described.

FIGS. 16A and 16B illustrates a light source device 30H in accordance with the eighth embodiment of the present invention. This embodiment is characterized by the use of a metal plate 60D for connecting the discharge tubes 31 and the wire harness 36. A development elevation of the metal plate 60D is shown in FIG. 16B. The broken lines in FIG. 16B indicate the folding lines.

The metal plate 60D according to this embodiment is characterized by having first caulking parts 61D for caulking the electrode terminals 33 of the discharge tubes 31 and a second caulking part 62D for caulking the terminal 37 of the wire harness 36. With such a structure, the electrode terminals 33 can be caulked with the first caulking parts 61D, while the terminal 37 is independently caulked with the second caulking part 62D. Thus, the connection strength can be increased.

Figure 17:
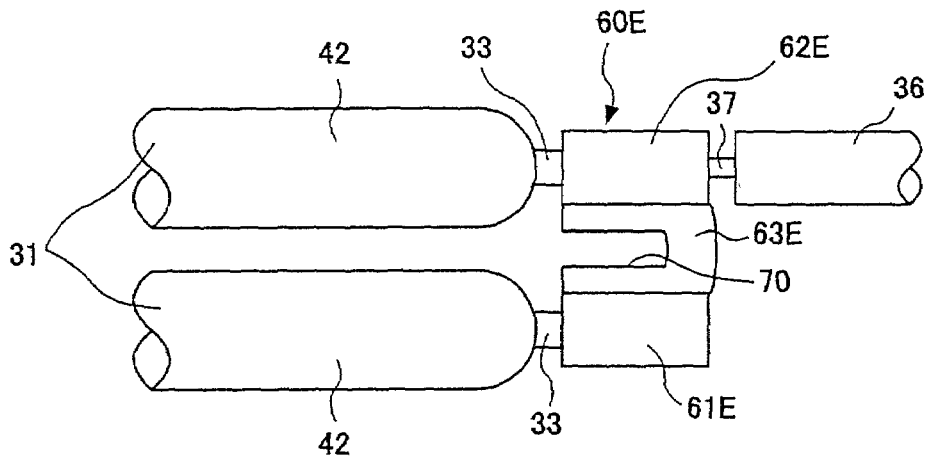
FIG. 17 is an enlarged plan view of the main parts in the vicinity of the metal plate in a light source device in accordance with a ninth embodiment of the present invention.

Referring now to FIG. 17, a ninth embodiment of the present invention will be described.

FIG. 17 illustrates a light source device 30I in accordance with the ninth embodiment of the present invention. This embodiment is characterized by a slit 70 formed in a base part 63E that interconnects a first caulking part 61E and a second caulking part 62E. With this slit 70, the base part 63E is made elastic.

As the base part 63E located between the first caulking part 61E and the second caulking part 62E of a metal plate 60E acts as an elastic part that can be elastically deformed, any external force applied to the discharge tubes 31, the wire harness 36, or the metal plate 60E after the caulking process, can be absorbed by the base part 63E being elastically deformed. In this manner, damage to the discharge tubes 31 due to external force can be prevented, and the reliability of the light source device 30I can thus be increased.

Although the base part 63E is made elastic with the formation of the slit 70 in this embodiment, holes may be formed in the base part 60E to give greater elasticity, or the base part 60E may be made thinner to obtain greater elasticity, for instance.

Figure 18:
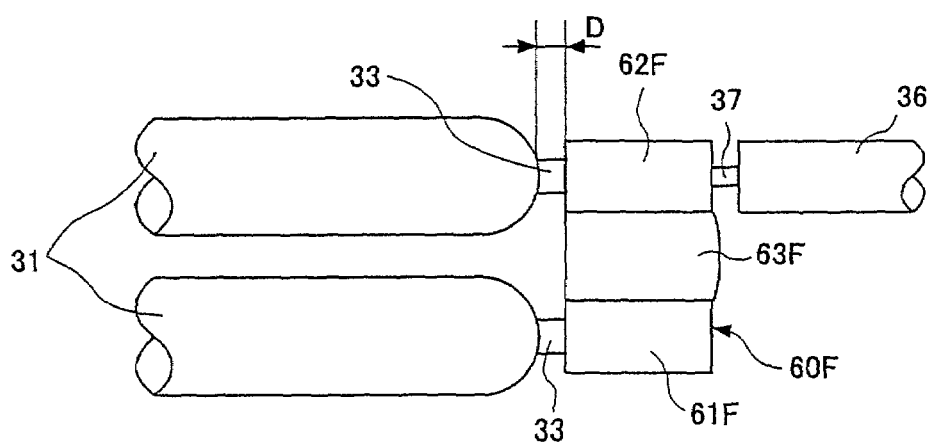
FIG. 18 is an enlarged plan view of the main parts in the vicinity of the metal plate in a light source device in accordance with a tenth embodiment of the present invention.

Referring now to FIG. 18, a tenth embodiment of the present invention will be described.

FIG. 18 illustrates a light source device 30J in accordance with the tenth embodiment of the present invention. This embodiment is characterized by the distance D from a metal plate 60F to the end portions of the glass tubes 42 of the discharge tubes 31. This distance D is at least as long as the diameter of each of the electrode terminals 33.

Figure 19:
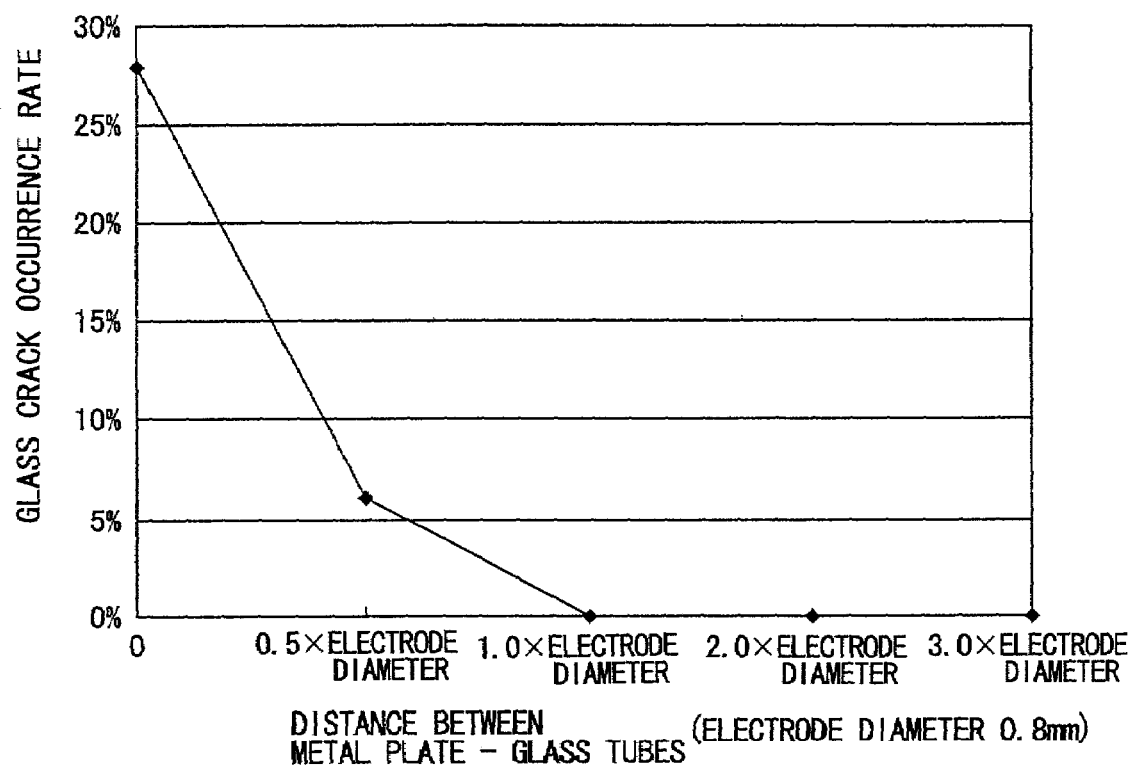
FIG. 19 is a graph showing the effects of the light source device in accordance with the tenth embodiment of the present invention.
Figure 20:
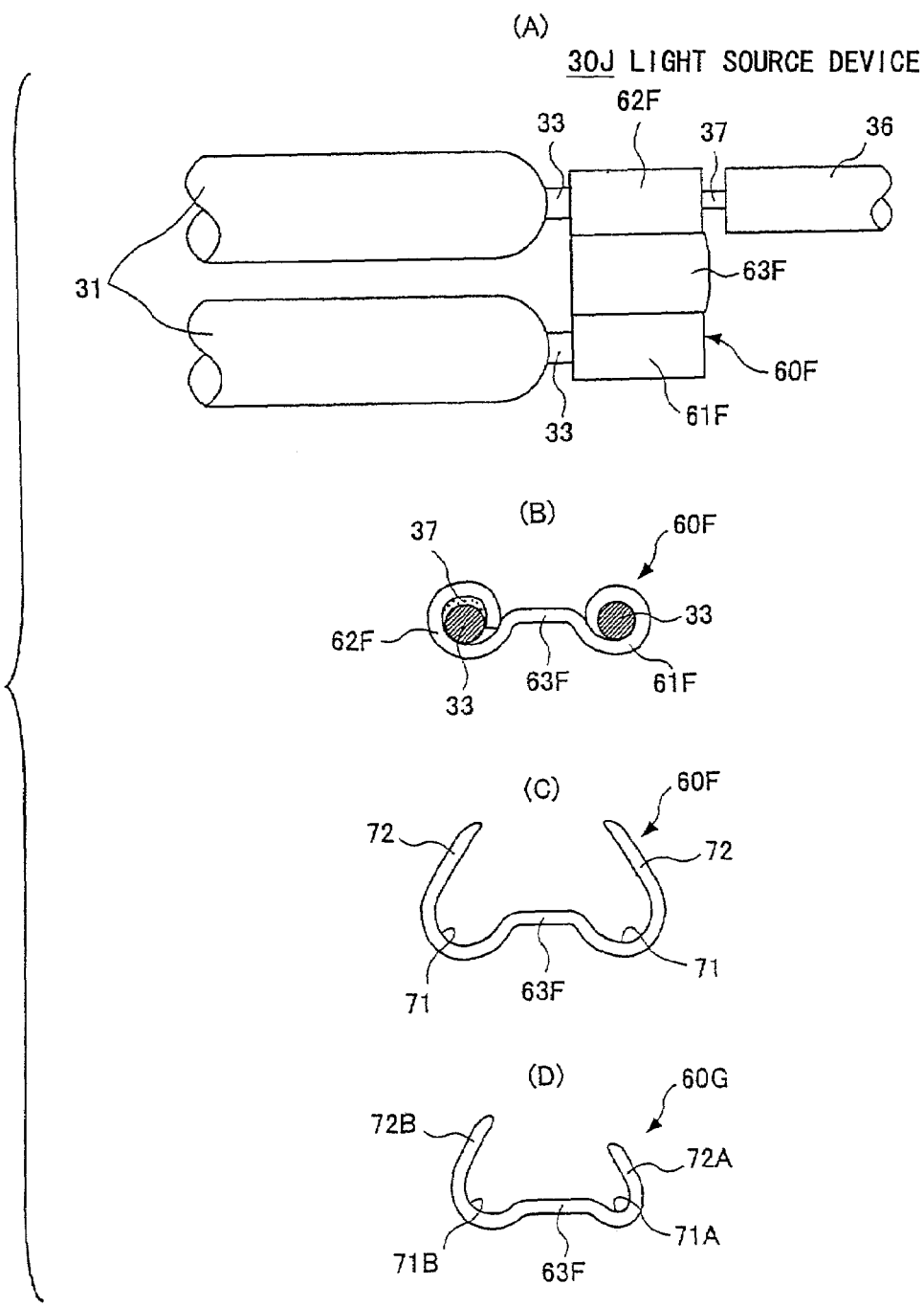
FIGS. 20A through 20D illustrate the metal plate used in the tenth embodiment in greater detail.

FIG. 19 shows the relationship between the distance from the metal plate 60F to the end portions of the glass tubes 42 (indicated by the horizontal axis) and the crack occurrence rate of the glass tubes 42 (indicated by the vertical axis). The data shown in FIG. 19 were gathered by the inventor(s) of the present invention through experiments. As can be seen from this graph, the crack occurrence rate is as high as 28% when the end portions of the glass tubes 42 are in contact with the metal plate 60F.

As the distance D from the metal plate 60F to the end portions of the glass tubes 42 increases, the crack occurrence rate gradually decreases. Where the distance D from the metal plate 60F to the end portions of the glass tubes 42 becomes equal to the diameter of each of the electrode terminals 33, the crack occurrence rate reaches zero. This is because the amount of elasticity at the locations of the electrode terminals 33 increases to such a point where all external force can be absorbed, with the distance D equal to the diameter of each of the electrode terminals 33.

In this manner, the distance D from the metal plate 60F to the end portions of the glass tubes 42 is set at a length equal to or greater than the diameter of each of the electrode terminals 33, so that the discharge tubes 31 can be prevented from cracking. However, an unnecessarily long distance between the metal plate 60F and the end portion of each of the glass tubes 42 only results in an increase of size of the light source device 30J. In view of this, it is desirable in practice that the distance D between the metal plate 60F and the end portion of each of the glass tubes 42 is set equal to the diameter of each of the electrode terminals 33.

FIGS. 20A through 20D illustrate the structure of the metal plate 60F that is employed in the light source device 30J according to the tenth embodiment.

As shown in FIG. 20A, the metal plate 60F also includes a first caulking part 61F and a second caulking part 62F. The first caulking part 61F and the second caulking part 62F are integrally connected by a base part 63F. FIG. 20B shows the metal plate 60F in a caulked state seen from the axis direction of the electrode terminals 33. As shown in this figure, one of the electrode terminals 33 is caulked with the first caulking part 61F, while the other one of the electrode terminals 33 and the terminal 37 are caulked with the second caulking part 62F.

FIG. 20C shows the metal plate 60F before the caulking process. The metal plate 60F is made of brass or German silver that contains brass and nickel, in view of the contour stability, corrosion resistance, and cost performance of these materials.

The metal plate 60F has a concave part 71 at both ends of the base port 63F. From each of the concave part 71, an extending part 72 extends upward as shown in FIG. 20C. When the caulking process is conducted, the electrode terminals 33 and the terminal 37 are placed in the concave parts 71.

More specifically, when the discharge tubes 31 and the wire harness 36 are connected with the metal plate 60F, one of the electrode terminals 33 is positioned into one of the concave parts 71, and the other one of the electrode terminals 33 and the terminal 37 are positioned into the other one of the concave parts 71 at the same time. The extending parts 72 are then caulked with the aid of the metal mold 65, which has already been described with reference to FIGS. 13A and 13B. In this manner, the first caulking part 61F and the second caulking part 62F can be simultaneously formed.

The first caulking part 61F and the second caulking part 62F are simultaneously formed, so that the electrode terminals 33 and the terminal 37 can be easily and accurately caulked at the predetermined positions on the metal plate 60F. When the electrode terminals 33 are placed in the respective concave parts 71, the distance between the two discharge tubes 31 is automatically determined by the distance between the two concave parts 71. Accordingly, the distance between the discharge tubes 31 can be accurately set.

Alternatively, the two concave parts may have different shapes, as shown in FIG. 20D. In this figure, a metal plate 60G has two concave parts 71A and 71B that have different shapes from each other. In this embodiment, the concave part 71B corresponding to the second caulking part 62F for accommodating one of the electrode terminals 33 and the terminal 37 is larger than the concave part 71A corresponding to the first caulking part 61F for accommodating only the other one of the electrode terminals 33.

In this manner, the sizes of the concave parts 71A and 71B are suitably changed depending on the number of terminals 33 and 37 to be accommodated therein, so that a caulking process can be conducted with precision even when the first caulking part 61F and the second caulking part 62F are simultaneously formed from the concave parts 71A and 71B. In such a structure, the electrode terminals 33 and the terminal 37 can be prevented from separating from of or falling off the first caulking part 61F and the second caulking part 62F.

Figure 21:
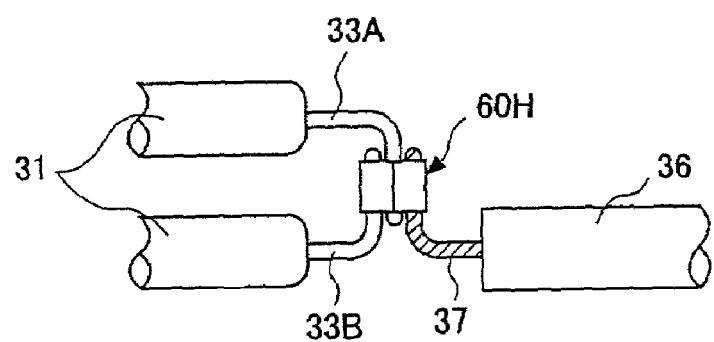
FIG. 21 is an enlarged plan view of the main parts in the vicinity of the metal plate in a light source device in accordance with an eleventh embodiment of the present invention.

Referring now to FIG. 21, an eleventh embodiment of the present invention will be described.

In this embodiment, electrode terminals 33A and 33B of the two discharge tubes 31 are bent at right angle, and are caulked with a metal plate 60H at the same time as the terminal 37 of the wire harness 36. With this structure, the small-size metal plate 60H contributes to a cost reduction, and the connection of the electrode terminals 33A and 33B to the terminal 37 can be made through only one caulking procedure, thereby simplifying the caulking process and reducing the total number of procedures in manufacturing the light source device.

Figure 22:
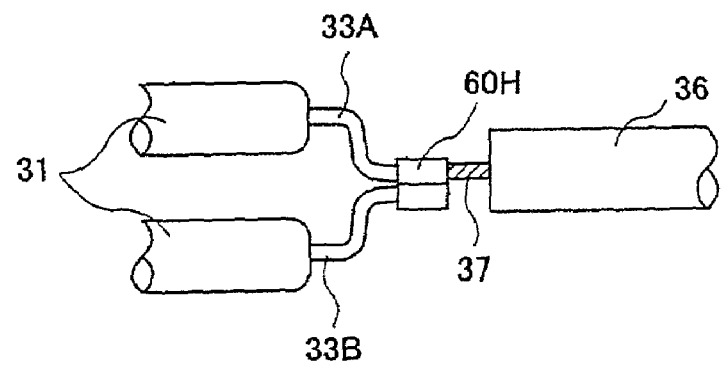
FIG. 22 is an enlarged plan view of the main parts in the vicinity of the metal plate in a modification of the eleventh embodiment.

FIG. 22 illustrates a modification of the light source device shown in FIG. 21. In this modification, the electrode terminals 33A and 33B of the discharge tubes 31 are bent like cranks, and are caulked with the metal plate 60H at the same time with the terminal 37 of the wire harness 36. With this structure, the small-size metal plate 60H contributes to a reduction of costs, and the connection of the electrode terminals 33A and 33B to the terminal 37 of the wire harness 36 are made through only one caulking procedure, thereby simplifying the caulking process and reducing the total number of procedures in manufacturing the light source device.

Figure 23:
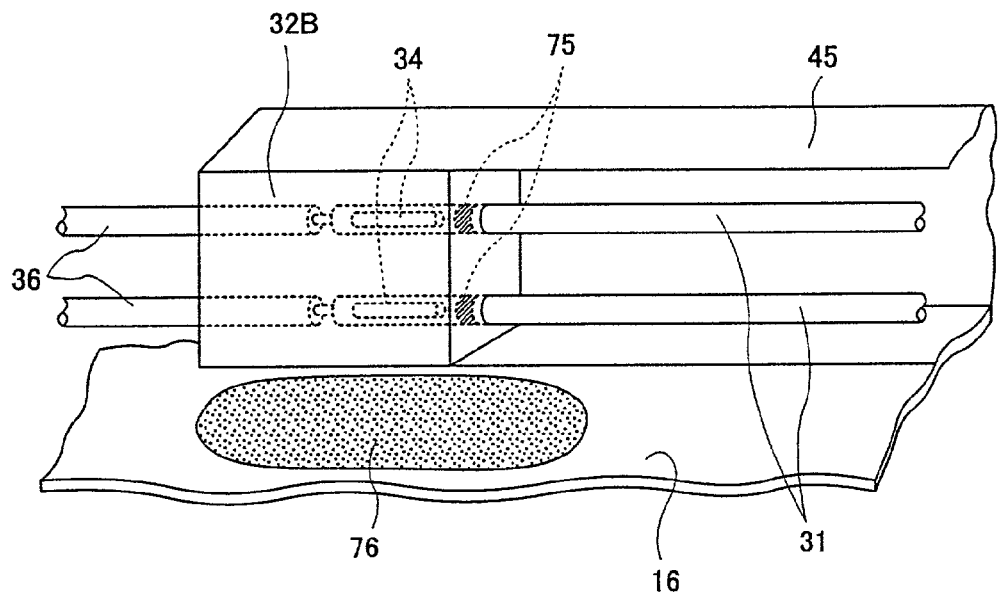
FIG. 23 is an enlarged perspective view of the main parts in the vicinity of the heat conductive member in a light source device in accordance with a twelfth embodiment of the present invention.

Referring now to FIG. 23, a twelfth embodiment of the present invention will be described.

FIG. 23 is an enlarged view of a heat conductive member 32B and its neighboring area in a light source device 30K in accordance with the twelfth embodiment of the present invention. As described above, the electrodes 34 are provided at the end portions of the discharge tubes 31, and the surrounding parts of the electrodes 34 are held by the heat conductive member 32B. The electrodes 34 are also connected to the wire harness 36.

Figure 24:
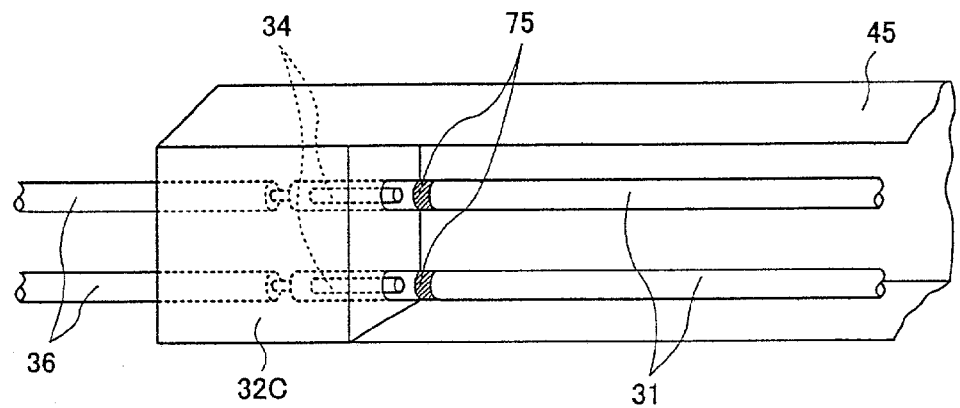
FIG. 24 is a perspective view of a light source device as a comparative example of the twelfth embodiment.

FIG. 24 is an enlarged view of a holding member 32C (corresponding to the heat conductive member 32B) of a conventional light source device that is shown here as a comparative example. In the prior art, the local cooling is not performed, and the holding member 32C is employed only to hold the discharge tubes 31. For this reason, the holding member 32C is made so small as not to reduce the incident rate of light from the discharge tubes 31 toward the light guide plate (shown in FIG. 3). This implies that the holding member 32C is made so small as not to cover the entire electrodes.

As each of the discharge tubes 31 nears to the end of service life, however, sputtered matter is gradually accumulated on the inner wall of the glass tubes within a distance of 1 mm to 2 mm from the light emitting end of the corresponding electrode 34. The areas in which the sputtered matter is deposited will be hereinafter referred to as sputter regions 75. When the sputtered matter is deposited in the sputter regions 75 at the light emitting ends of the electrodes 34, electric current flows through the sputtered matter and generates heat. Especially, when the voltage is high, electric discharge might occur between the reflector 45 and the sputter regions 75. With such electric discharge, the luminance level in the light source device becomes uneven, resulting in a large reduction in the service life of the discharge tubes 31.

To avoid such a problem, the twelfth embodiment of the present invention has the heat conductive member 32B covering the sputter regions 75 to which the sputtered matter is deposited in the glass tubes due to electric discharge, as shown in FIG. 23. More specifically, the heat conductive member 32B covers the discharge tubes 31 to such a point that the regions at a distance of 1 mm or longer from the light emitting end of each electrode 34 can be completely covered.

The heat conductive member 32B is made of an insulating material such as silicone rubber. Accordingly, with the heat conductive member 32B covering the sputter regions 75, electric discharge between the reflector 45 and the sputter regions 75 can be prevented. Thus, the reliability of the light source device 30K can be increased.

However, if the heat conductive member 32B is too large, a part of the light emitting regions of the discharge tubes 31 is also covered with the heat conductive member 32B, resulting in the shadow of the heat conductive member 32B entering the plane of incidence of the light guide plate 14. In such a case, the surrounding area of both ends of each discharge tube 31 becomes too dark.

To solve this problem, this embodiment has a high density region 76 that has a dotted pattern or lined pattern at a high density on the light guide plate 14. This high density region 76 is located in the vicinity of the sputter regions 75, which is the vicinity of the end portions of the discharge tubes 31. In this structure, the reflectance of the light guide plate 14 increases in the vicinity of the sputter regions 75, thereby increasing the luminance in the vicinity of the heat conductive member 32B in the light source device 30K. Thus, the luminance of light can be made uniform in the entire light source device 30K.

Figure 25:
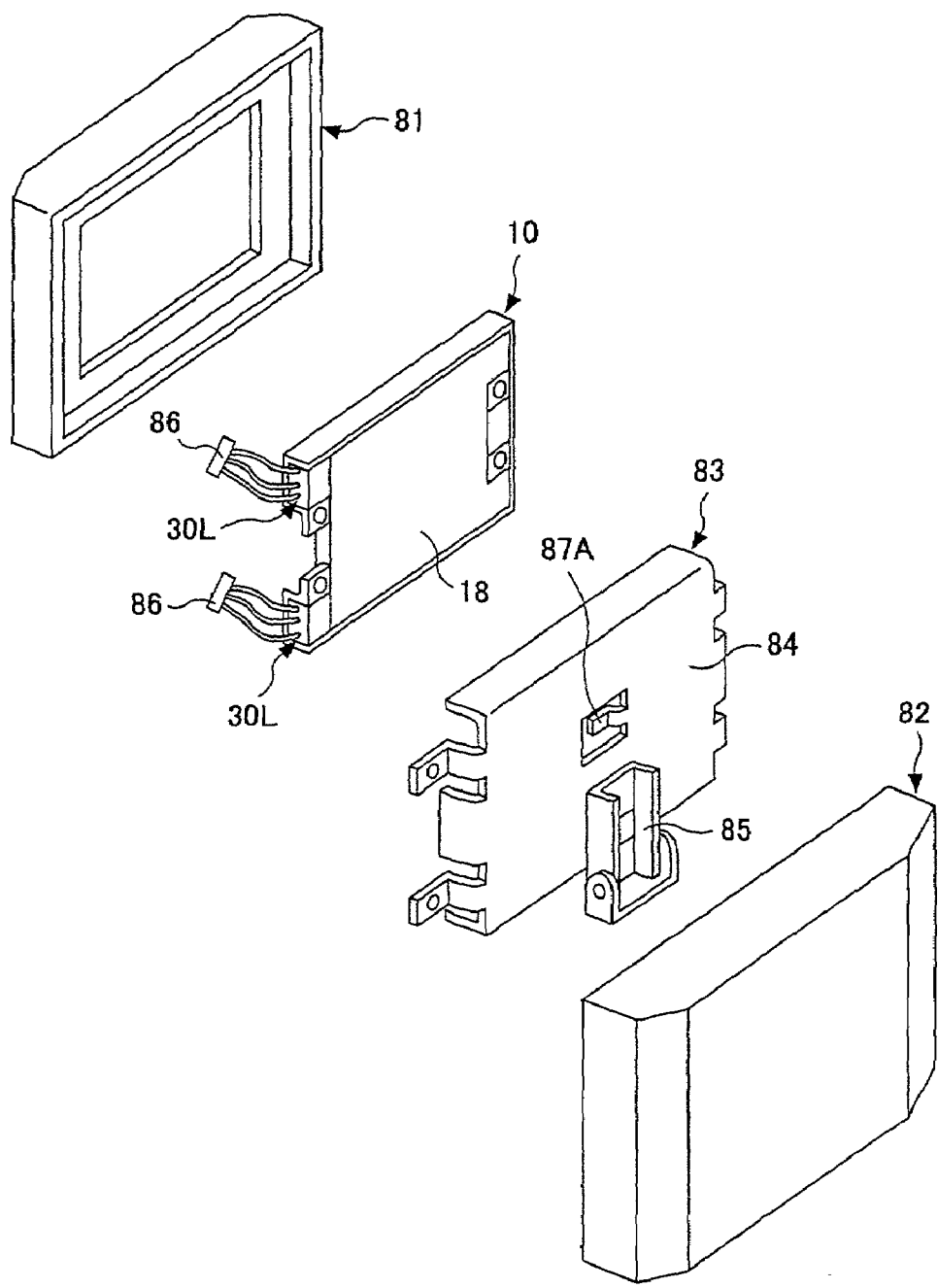
FIG. 25 is an exploded perspective view of a liquid crystal display apparatus in accordance with a thirteenth embodiment of the present invention.
Figure 26:
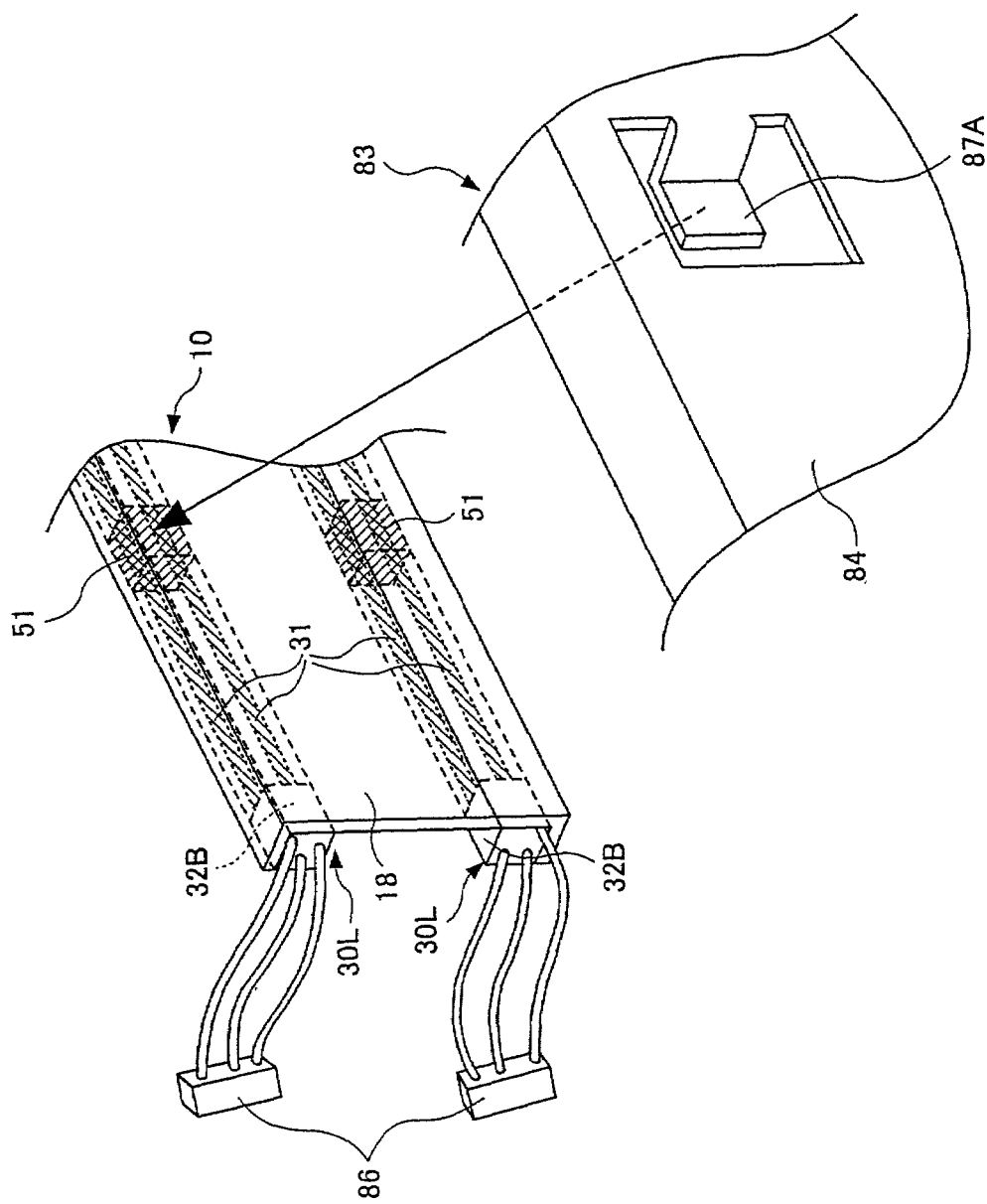
FIG. 26 is an enlarged view of the main parts of the liquid crystal display apparatus shown in FIG. 25.

Referring now to FIGS. 25 and 26, a thirteenth embodiment of the present invention will be described.

FIGS. 25 and 26 illustrate a liquid crystal display apparatus 80 in accordance with the thirteenth embodiment of the present invention. FIG. 25 is an exploded perspective view of the liquid crystal display apparatus 80, and FIG. 26 is an enlarged perspective view of the main components in the liquid crystal display apparatus 80. The liquid crystal display apparatus 80 includes a liquid crystal display unit 10, a front cover 81, a rear cover 82, and a holding unit 83.

The liquid crystal display unit 10 has a light source device 30L provided at the upper side and the lower-side thereof. This light source device 30L has the same structure as the light source device 30A shown in FIG. 3. The above-mentioned local cooling is performed in the light source device 30L, and the central heat conductive member 51 is therefore provided at the predetermined position on the discharge tubes 31.

The liquid crystal display unit 10 is secured by the holding unit 83. The holding unit 83 includes a holding panel 84 and a tilting mechanism 85. The holding panel 84 is formed by molding a metal plate such as an aluminum plate or a steel plate, and has a high heat conductivity. The tilting mechanism 85 tilts the holding plate 84, so that the liquid crystal panel 11 can be made easier for a user to see. The liquid crystal device 80 has the front cover 81 and the rear cover 82 covering the holding unit 83 that secures the liquid crystal display unit 10.

As mentioned above, the local cooling is performed in this embodiment, and the central heat conductive member 51 is therefore provided at the predetermined position on the discharge tubes 31. The central heat conductive member 51 is engaged with the discharge tubes 31, as shown in FIG. 8, so that the heat can be conducted from the discharge tubes 31 toward the reflector 45. The heat conducted to the reflector 45 is then released to the outside via the back face panel 18 of the liquid crystal display unit 10.

The attachment position for the central heat conductive member 51, however, is deep inside the liquid crystal display unit 10, and is a difficult position for heat release. For this reason, there are times when heat cannot be released effectively through the central heat conductive member 51, resulting in an uneven luminance in the light source device 30L.

To solve this problem, the holding plate 84 of the holding unit 83 is provided with a heat releasing part 87A that is thermally connected to the central heat conductive member 51 in this embodiment. The heat releasing part 87A is formed at a location on the holding panel 84 corresponding to the attachment position of the central heat conductive member 51. The heat releasing part 87A is formed integrally with the holding plate 84 by a stamping process, and is bent toward the liquid crystal display unit 10. Accordingly, the formation of the heat releasing part 87A can be easily completed.

When the liquid crystal display unit 10 is mounted to the holding unit 83, the heat releasing part 87A having the above structure is brought into contact with the back side of the attachment position of the central heat conductive member 51 (i.e., the bade side of the back face panel 18), as shown in FIG. 26. In this structure, the heat generated in the discharge tubes 31 is conducted to the central heat conductive member 51, which then conducts the heat to the back face panel 18 via the reflector 45.

Since the heat releasing part 87A is in contact with the back face panel 18 located at the back side of the central heat conductive member 51, the central heat conductive member 51 is thermally connected to the holding plate 84 of the holding unit 83 via the reflector 45 and the back face panel 18. Accordingly, the heat generated in the discharge tubes 31 can be effectively released, and the local cooling can be effectively performed on the discharge tubes 31. Thus, the luminance in the entire discharge tubes 31 can be stabilized.

Figure 27:
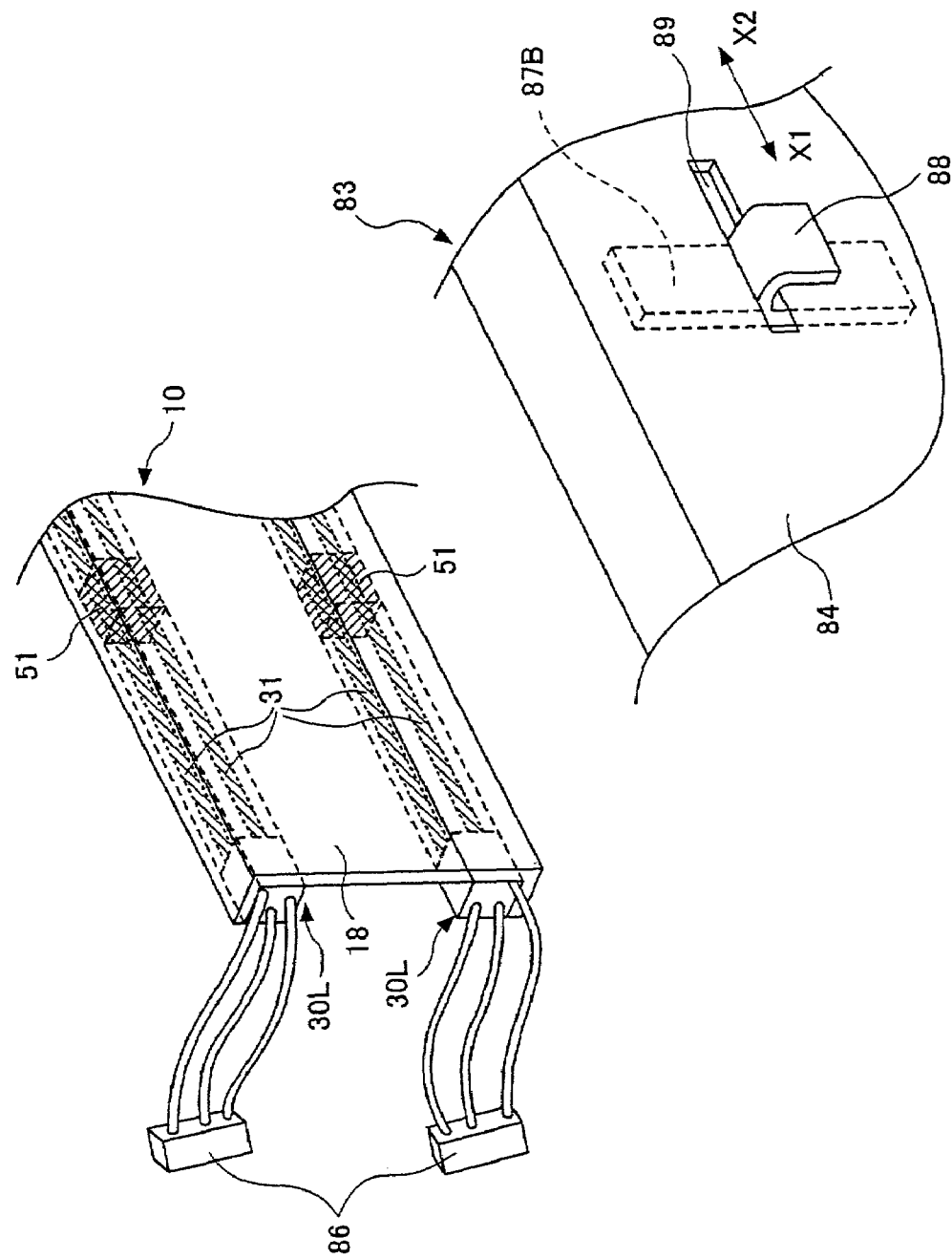
FIG. 27 illustrates a first modification of the liquid crystal display apparatus shown in FIG. 25.

FIG. 27 illustrates a first modification of the liquid crystal display apparatus 80 according to the thirteenth embodiment of the present invention. In accordance with this modification, a heat releasing part 87B is provided with a knob 88, which can move along a guide groove 89 formed in the holding plate 84. The moving directions of the knob 88 are indicated by the arrows X1 and X2 in FIG. 27. One side of the heat releasing part 87B is slidably in contact with the back face panel 18, while the other side of the heat releasing part 87B (which is the side provided with the knob 88) is slidably in contact with the holding plate 84.

More specifically, the knob 88 slides in the direction of the arrow X2, so that the heat releasing part 87B is brought closer to the attachment position of the central heat conductive member 51. On the other hand, the knob 88 slides in the direction of the arrow X1, the heat releasing part 87B is moved away from the attachment position of the central heat conductive member 51. The back face panel 18 and the holding plate 84 are thermally connected only by the heat releasing part 87B. Accordingly, the knob 88 slides in the direction of the arrow X2 so as to increase the amount of heat released through the central heat conductive member 51. Alternately, the knob 88 slides in the direction of the arrow X1 so as to reduce the amount of heat released through the central heat conductive member 51.

As already mentioned, the concentration of the mercury gas within the discharge tubes 31 depends on the temperature of the discharge tubes 31. Because of this, the concentration of the mercury gas (i.e., the luminance) can be adjusted by controlling the cooling of the discharge tubes 31. Accordingly, the heat releasing part 87B acts as an adjusting mechanism for adjusting the heat conductivity of the central heat conductive member 51, so that the heat release through the central heat conductive member 51 can be adjusted to the optimum condition. Thus, the luminance in the entire discharge tubes 31 can be stabilized.

Figure 28:
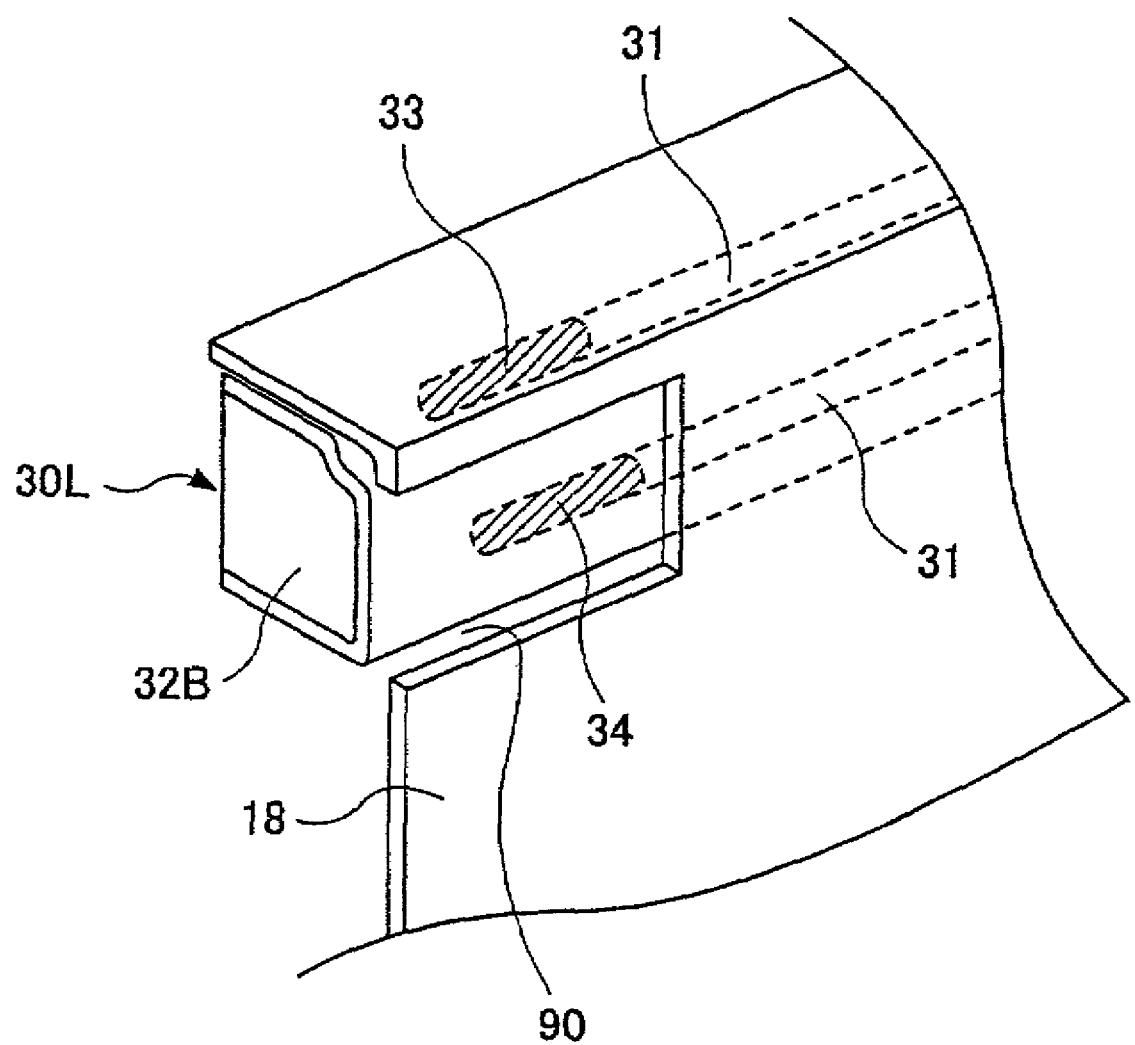
FIG. 28 illustrates a second modification of the liquid crystal display apparatus shown in FIG. 25.

FIG. 28 illustrates a second modification of the liquid crystal display apparatus 80 in accordance with the thirteenth embodiment of the present invention. In accordance with this modification, the back face panel 18 is provided with an opening 90 at a position corresponding to the back side of the heat conductive member 32B. With this opening 90, the terminal 37 of the wire harness 36 is directly brought into contact with the heat conductive member 32B so as to increase the heat releasing rate of the heat conductive member 32B.

As in this modification, the heat conductive member 32B located at each end of the light source device 30L, instead of the attachment position of the central heat conductive member 51, can be cooled down so as to increase the heat releasing rate. To perform the local cooling effectively, the heat releasing part 87A may cool down parts other than the heat conductive member 32B and the attachment position of the central heat conductive member 51.

It should be noted that the present invention is not limited to the embodiments specifically disclosed above, but other variations and modifications may be made without departing from the scope of the present invention.

What is claimed is:

1. A light source device comprising:
a discharge tube;
a first heat conductive member for locally cooling down a neighboring area of an electrode of the discharge tube through contact with the electrode of the discharge tube; and
a second heat conductive member that fills substantially an entire space between the first heat conductive member and the discharge tube.

2. The light source device as claimed in claim 1, wherein the second heat conductive member comprises room temperature vulcanization (RTV) rubber and maintains an electrode terminal of the discharge tube at a temperature lower than a creep temperature of a joining member provided for the electrode terminal, and
a first temperature T1 of a part of the discharge tube in contact with the first heat conductive member or the second heat conductive member is equal to or higher than a second temperature T2 of a part of the discharge tube not in contact with the first heat conductive member or the second heat conductive member, where the relationship between the first temperature T1 and the second temperature T2 is expressed as $T1 \geq T2$.

3. The light source device as claimed in claim 2, wherein the second heat conductive member is hardened at a temperature lower than the creep temperature of the joining member provided for the electrode terminal, or grease.

4. A light source device comprising:
a discharge tube;
a reflector for reflecting light radiating from the discharge tube; and
a plurality of spacers that are attached to the reflector and secure the discharge tube to the reflector,
wherein a first spacer among the plurality of spacers holds an electrode terminal of the discharge tube at a predetermined position,
a second spacer among the plurality of spacers holds a wire line connected to the discharge tube, and
a space surrounded by the first spacer, the second spacer, and the reflector, is filled with a heat conductive member.

5. The light source device as claimed in claim 4, wherein the heat conductive member comprises room temperature vulcanization (RTV) rubber and maintains an electrode terminal of the discharge tube at a temperature lower than a creep temperature of a joining member provided for the electrode terminal, and
a first temperature T1 of a part of the discharge tube in contact with the heat conductive member is equal to or higher than a second temperature T2 of a part of the discharge tube not in contact with the heat conductive member, where the relationship between the first temperature T1 and the second temperature T2 is expressed as $T1 \geq T2$.

6. The light source device as claimed in claim 5, wherein the heat conductive member is hardened at a temperature lower than the creep temperature of the joining member provided for the electrode terminal, or grease.

7. A display apparatus comprising:
a light source device; and
a display device illuminated by the light source device,
wherein the light source device includes:
a discharge tube;
a first heat conductive member for locally cooling down a neighboring area of an electrode of the discharge tube through contact with the electrode of the discharge tube; and
a second heat conductive member that fills substantially an entire space between the first heat conductive member and the discharge tube.

8. A light source device comprising:
a discharge tube for emitting light by causing electric discharge between electrodes provided at both ends of a glass tube;
a reflector for reflecting light radiating from the discharge tube; and
a heat conductive holding member for holding an end portion of the discharge tube and cooling down the discharge tube at the held position thereof,
wherein the heat conductive holding member covers at least the light emitting end of each of the electrodes and a sputter region onto which sputtered matter is gradually accumulated inside the glass tube due to the electric discharge.

9. A display apparatus comprising:
a light source device;
a display device illuminated by the light source device; and
a light guide plate that receives incident light from the light source device, and guides the incident light toward the display device with a reflecting layer,
wherein the light source device includes:
a discharge tube for emitting light by causing electric discharge between electrodes provided at both ends of a glass tube;
a reflector for reflecting light radiating from the discharge tube; and
a heat conductive holding member for holding an end portion of the discharge tube and cooling down the discharge tube at the held position thereof, said heat conductive holding member covering a sputter region onto which sputtered matter is deposited inside the glass tube due to the electric discharge, and the reflecting layer has a higher density in the vicinity of the sputter region in the light source device.

10. A display apparatus comprising:
a light source device that includes a discharge tube and a heat conductive member in contact with a part of the discharge tube so as to locally cool down the part of the discharge tube;
a display device illuminated by the light source device; and
a holding unit for holding the display device, said holding unit being provided with a heat releasing part that is thermally connected to the heat conductive member so as to release heat from the heat conductive member.

11. The display apparatus as claimed in claim 10, further comprising an adjusting mechanism for adjusting heat conductivities of the heat releasing part and the heat conductive member.

12. A light source device comprising:
a plurality of discharge tubes that are arranged in parallel with each other;
a wire line for power supply; and
a unitary metal plate that is mechanically pressurized so as to connect the wire line and electrodes extending from end portions of glass tubes of the discharge tubes, which metal plate is provided with a plurality of mechanically pressurizing parts for mechanically pressurizing the electrodes of the discharge tubes at locations corresponding to predetermined attachment locations of the discharge tubes,
wherein said mechanically pressurizing parts are integrally formed as a portion or portions of said unitary metal plate.

13. The light source device as claimed in claim 12, wherein the metal plate has an electrode mechanically pressurizing part for mechanically pressurizing the electrodes and a wire mechanically pressurizing part for mechanically pressurizing the wire line.

14. The light source device as claimed in claim 12, wherein the metal plate has a first mechanically pressurizing part for mechanically pressurizing one of the electrodes and a second mechanically pressurizing part for simultaneously mechanically pressurizing the other one of the electrodes and the wire line.

15. The light source device as claimed in claim 14, wherein
the first mechanically pressurizing part has a first concave portion to which one of the electrodes is mounted,
the second mechanically pressurizing part has a second concave portion to which the other one of the electrodes and the wire line are simultaneously mounted, and
the second concave portion is larger than the first concave portion.

16. The light source device as claimed in claim 12, wherein an elastic deformable part is formed between each two neighboring mechanically pressurizing parts among the plurality of mechanically pressurizing parts.

17. The light source device as claimed in claim 12, wherein a distance between the metal plate and the end portions of the glass tubes of the discharge tubes is at least as long as the diameter of each of the electrodes.

18. A display apparatus comprising:
a light source device; and
a display device illuminated by the light source device,
wherein the light source device includes:
a plurality of discharge tubes that are arranged in parallel with each other;
a wire line for power supply; and
a unitary metal plate that is mechanically pressurized so as to connect the wire line and electrodes extending from end portions of glass tubes of the discharge tubes, said metal plate being provided with a plurality of mechanically pressurizing parts for mechanically pressurizing the electrodes of the discharge tubes at locations corresponding to predetermined attachment locations of the discharge tubes,
wherein said mechanically pressurizing parts are integrally formed as a portion or portions of said unitary metal plate.

* * * * *